(12) United States Patent
Morrison et al.

(10) Patent No.: US 8,321,812 B2
(45) Date of Patent: Nov. 27, 2012

(54) INTERACTIVE USER INTERFACE WITH TABS

(76) Inventors: Paul-David Morrison, Cedar Park, TX (US); Gerardo Garcia, Cedar Park, TX (US)

( * ) Notice: Subject to any disclaimer, the term of this patent is extended or adjusted under 35 U.S.C. 154(b) by 63 days.

(21) Appl. No.: 12/870,796

(22) Filed: Aug. 28, 2010

(65) Prior Publication Data

US 2011/0055751 A1    Mar. 3, 2011

Related U.S. Application Data

(63) Continuation of application No. 09/738,050, filed on Dec. 15, 2000, now abandoned.

(51) Int. Cl.
*G06F 3/00* (2006.01)
(52) U.S. Cl. ....................................................... 715/853
(58) Field of Classification Search .................. 715/777, 715/810, 853, 854
See application file for complete search history.

(56) References Cited

U.S. PATENT DOCUMENTS 6,240,410 B1 * 5/2001 Wical ..................................... 1/1
6,798,427 B1 * 9/2004 Suzuki et al. ................... 84/604

* cited by examiner

*Primary Examiner* — Thanh Vu
(74) *Attorney, Agent, or Firm* — Anthony V S England; Rick B. Yeager; Jerry M. Keys

(57) ABSTRACT

A method and apparatus for an interactive catalog includes presenting a portion of a database. The method includes presenting a first tier of selectable graphics images. Each selectable graphics image in the first tier of selectable graphics images represents a first collection of data structures corresponding thereto. The method also includes presenting a second tier of selectable graphics images, in response to a selecting of a selectable graphics image of the first tier to produce a first tier selected graphics image. Each selectable graphics image in the second tier of selectable graphics images represents a second collection of data structures. Each data structure in the second tier also belongs to the first collection of data structures corresponding to the first tier selected graphics image.

1 Claim, 14 Drawing Sheets

SILIKON BOOKS

| FILE | TRANSMIT 110 | 111 | | 112 | | 114 | | 116 | | 118 | |
|------|---|---|---|---|---|---|---|---|---|---|---|
| MAIN CATALOG PAGE | TABLE OF CONTENTS | A-PGS. 1-162 | B-PGS. 163-284 | C-PGS. 285-462 | D/E-PGS. 463-590 | ▲ 102 ▼ | ▲ 104 ▼ 106 |
| ADHESIVES 120 | AIR CLEANERS/HUMIDIFIERS 121 | ART/DRAFTING 122 | 123 | 124 | 125 | 126 | 127 | 128 | |
| PG. 4 | PG. 5 | PG. 6 | | | | | | | |

130  131  132  133  134  135  136  137 138

3M
REMOVE UP TO 89% OF AIR BORN DUST AND POLLEN
PRODUCT NO.   DESCRIPTION   QUANTITY   PRICE
MMM 100        22X24' AREA     1            $274.51

TO PURCHASE
☐ QUANTITY

WINDMERE
CLEANS A 10X20' ROOM 3 TIMES PER HOUR
PRODUCT NO.   DESCRIPTION   QUANTITY   PRICE
MMM 200        10X24' AREA     1            $99.99

TO PURCHASE
☐ QUANTITY

HONEYWELL
THE HONEYWELL HEPA FILTER HELPS REMOVE 93% OF AIRBORNE PARTICLES
PRODUCT NO.   DESCRIPTION   QUANTITY   PRICE
MMM 200        93%             1            $55.55

TO PURCHASE
☐ QUANTITY

[ PRODUCT PHOTO 1 ]  [ PRODUCT PHOTO 2 ]  [ PRODUCT PHOTO 3 ]

[ PRODUCT PHOTO 4 ]  [ PRODUCT PHOTO 5 ]

[ ADD TO ORDER ]

| | | | | | | | | |
|---|---|---|---|---|---|---|---|---|
| 1 | AAG7005405 | WEEKLY APPOINTMENT BOOKS | $12.49 | $12.49 | Package | | 2025 | |
| 2 | ARS444BK | FLEXARM TRADITIONAL STYLE LAMPS | $89.95 | $89.95 | Package | | 123 | |
| 3 | AVE05118 | IAELPRO DISKETTE | $64.99 | $64.99 | Package | | 456 | |
| 4 | AVE56-111 | ACCOUNT BOOKS | $18.59 | $18.59 | Package | | 56 | |
| 5 | BFD10163 | MOBILE OVERHEAD PROJECTOR CART | $416.00 | $416.00 | Package | | 87 | |
| 6 | BRTPFF2750 | LASER FAX WITH COPIER SYSTEM | $899.99 | $899.99 | Package | | 789 | |
| 7 | BRTPT9200PC | PTOUCH PCLABEL MAKER | $699.95 | $699.95 | Package | | 453 | |
| 8 | CCS24300 | COMPRESSED AIR | $4.79 | $4.79 | Package | | 423 | |
| 9 | DTM83151 | FOLIO-SIZE DELUXE STARTER SETS | $139.00 | $139.00 | Package | | 786 | |
| 10 | FEL93897 | FELLOWES ANTI-GLARE SCREENS | $149.95 | $149.95 | Package | | 98 | |
| 11 | HUN2004 | 4? BULLDOG CLIP | $11.50 | $11.50 | Package | | 234 | |
| 12 | LAKP25 | 3 SPEED 20?PORTABLE FAN | $128.95 | $128.95 | Package | | 121 | |
| 13 | MMM653AN | NEON COLOR POST IT NOTES | $8.33 | $8.33 | Package | | 223 | |
| 14 | PENPG1005 | GRAPH 1000 AUTOMATIC DRAFTING PENCIL | $15.00 | $15.00 | Package | | 437 | |
| 15 | QUA10912 | TRADITIONAL BUSINESS ENVELOPES | $34.90 | $34.90 | Package | | 785 | |
| 16 | RAN111702615 | U.S. WALL MAP | $199.50 | $199.50 | Package | | 653 | |
| 17 | RUB637500 | ANGLED BRUTE BROOM | $16.86 | $16.86 | Package | | 654 | |
| 18 | SMD1329E | SMEAD PARTITIONAL WALLETS | $4.25 | $4.25 | Package | | 864 | |
| 19 | SOR5430 | DUAL HANDLE HAND TRUCK | $112.45 | $112.45 | Package | | 534 | |
| 20 | TEXTI83 | TI-83 GRAPHING CALCULATOR | $136.49 | $136.49 | Package | | 879 | |
| 21 | WLJ364-49EB | DUBLOCK RING BINDERS | $23.54 | $23.54 | Package | | 976 | |
| 22 | HP500CP | HEWLET PACKARD LASER PRINTER | $300.00 | $300.00 | | *Printer; laser printer; color printer; office equipment | 875 | PDM |

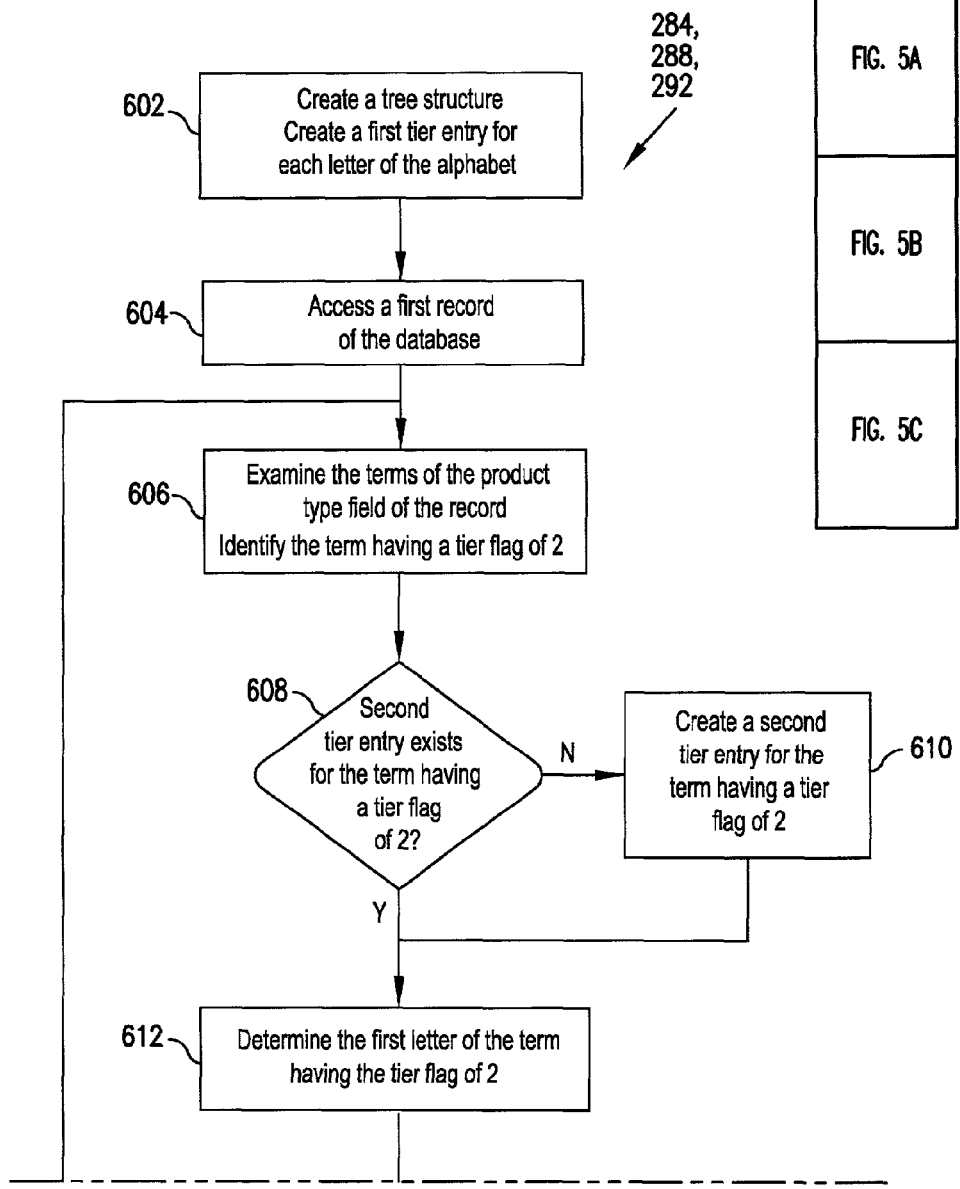

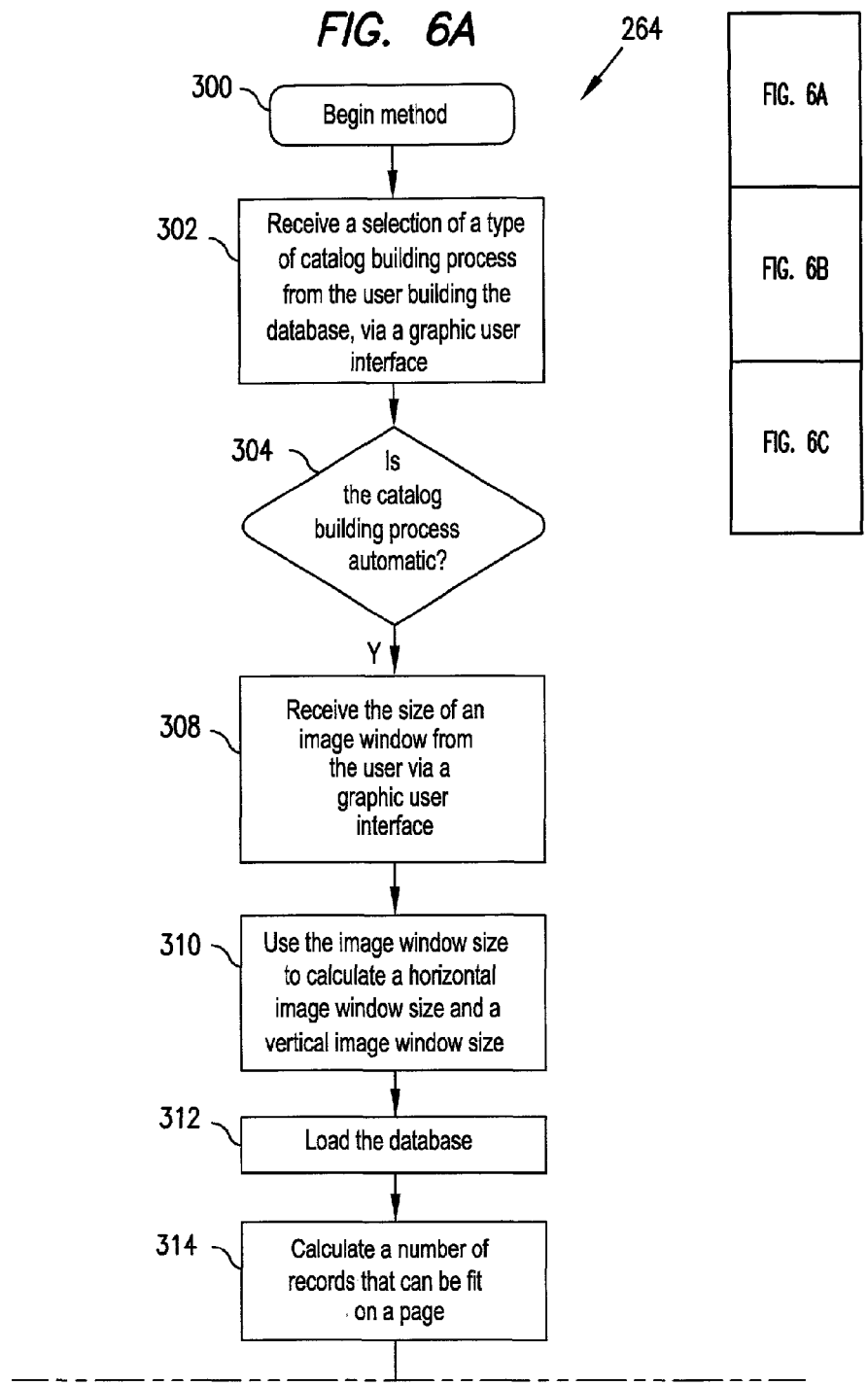

INTERACTIVE USER INTERFACE WITH TABS

CROSS-REFERENCE TO RELATED APPLICATION

This application is a continuation of prior application Ser. No. 09/738,050, filed on Dec. 15, 2000, now abandoned which is incorporated herein by reference.

FIELD OF THE INVENTION

The invention relates generally to interactive computer technology and more particularly to method and apparatus for an interactive catalog.

BACKGROUND OF THE INVENTION

Online or computer-based shopping can be a tedious and difficult activity. Even when a single supplier or distributor is selected, the number of products available can be overwhelming. Unfortunately, searching for a particular product often requires "drilling down" a web site by clicking on a button on a first page to get to a second page, clicking on a button on a second page to get to a third page, and so on until a page showing the product that is desired appears. If the web site designer cannot anticipate the myriad ways in which different potential customers think of the same product, then the web site can be difficult for the potential customer to navigate. Some allow text-based searching, which can be useful if the potential customer and the web site designer use the same words to describe the product.

Many potential customers find paperbound catalogs of products easier to use. Customers can thumb through a paperbound catalog quickly, finding a section that is likely to contain the desired product, and then read a particular page of the catalog to obtain information quickly. A paperbound catalog often contains a table of contents organized by category, an index organized alphabetically, a list of manufacturers organized by company name, and a list of part numbers or product numbers organized numerically. These sections of the paperbound catalog are often cross-referenced to one another and to a page showing a picture of the product.

Therefore, a need has arisen for an electronic catalog that can be used as a paperbound catalog.

BRIEF DESCRIPTION OF THE DRAWINGS

FIG. 1 shows a screen object having a first tier, a second tier, a third tier, and an image window, in accordance with one embodiment of the present invention.

FIG. 2 shows a tabular representation of several records selected from a portion of database, in accordance with one embodiment of the present invention.

FIG. 5A shows actions regarding aspects of FIG. 5.

SUMMARY OF THE INVENTION

Figure 3:
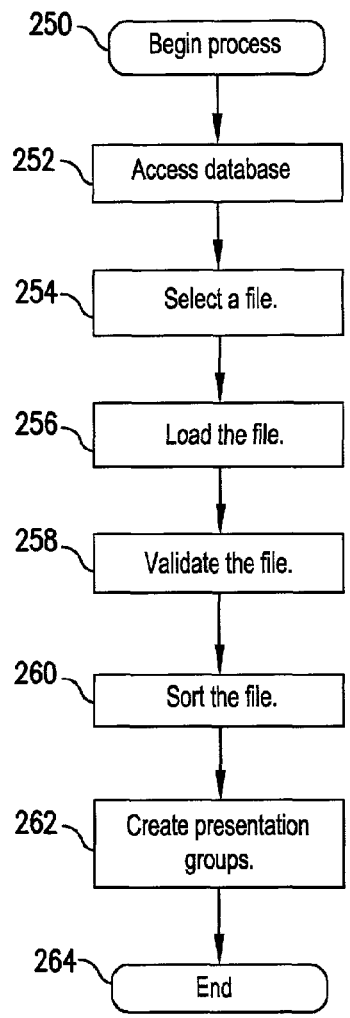
FIG. 3 shows a flow chart of a process for generating a four-tier database interface based upon a database, in accordance with one embodiment of the present invention.

The disclosed method and apparatus for an interactive catalog includes a collection of methods that allow a merchant or supplier to organize products in many different ways. Customers can choose various ways to "thumb through" the products. A customer is presented with a row of tabs, referred to as a first tier. In this embodiment, the first tier includes an alphabetical list of categories, including "A."

Each tab in the first tier has a collection of categories associated therewith. A second tier of tabs, appearing directly below the first tier of tabs, allows a customer to select a product category tier tab.

The catalog includes a collection of graphic images for the products available from the merchant or supplier. The graphic images are arranged dynamically into pages as the customer clicks on the various tabs. Each tab has at least one page associated therewith. As the customer clicks on various tabs, the page associated with the tab, or the first page if the tab has several pages associated therewith, is displayed. No matter how the customer desires to thumb through the catalog, pages are selected to accommodate the customer.

Moreover, the tabs are themselves dynamically selected. For example, the tabs such as those beginning with the letter "A" may be displayed. As the customer clicks on a tab identifying a category of products, a collection of subcategories of products is displayed. A tab and page for each of the subcategories is presented as the second tier. When the customer clicks on a product category tier tab, a collection of subcategories such as page numbers is displayed as the third tier.

DETAILED DESCRIPTION OF AN EMBODIMENT OF THE INVENTION

Screen For Searching and Purchasing Products using the Online Catalog

FIG. 1 shows a screen object having a first tier 102, a second tier 104, a third tier 106, and an image window 108, in accordance with one embodiment of the present invention.

The first tier 102, also known as an alpha tier, includes several tabs 110-118. As shown in FIG. 1, each of the tabs 110-119 of the first tier 102 is assigned one or more letters of the alphabet. For example, tab 112 is assigned the letter "A," tab 114 is assigned the letter "B," tab 116 is assigned the letter "C," and tab 118 is assigned the range of letters "D" and "E." It will be recognized that one or more of the tabs 110-118 may be replaced with any graphics image including an icon, a JPEG image, a GIF image, text message, or other graphics image. It will also be recognized that tab content may include any top-level organization of the online catalog.

In accordance with one embodiment of the present invention, the first tier 102 is scrollable. In other words, the first tier 102 may include additional first tier tabs that are not shown, such as a tab 119 (not shown until the first tier 102 is scrolled to display it) that is assigned the letter "P." A user may scroll the tabs 110-118 to the left or to the right. As the user scrolls the tabs 110-118, the additional first tier tabs become visible.

In accordance with one embodiment of the present invention, the first tier 102 is visually scalable. In other words, as the user enlarges or reduces the size of the first tier 102, the size of the tabs enlarges or reduces as well. In accordance with another embodiment of the present invention, the first tier 102 is visually stretchable in at least one direction. In other words, as the user enlarges or reduces the size of the first tier 102 in a first direction, the size of each tab remains unchanged and number of tabs of the first tier 102 that is visible increases or reduces.

In accordance with one embodiment of the present invention, the first tier 102 is integrated into a browser, such that when a browser button is selected at least one tab is presented. In accordance with another embodiment of the present invention, each of the tabs 110-119 of the first tier 102 is implemented as a control such as an active-X control. The first tier 102 is separable from the second tier 104, the third tier 106, and the image window 108 as a control, and may be moved about on the screen using a graphical user interface. Moreover, the first tier 102 may be oriented in either a vertical direction or a horizontal direction. Using a command from a pull-down menu, a user may change the orientation from the vertical direction to the horizontal direction, or vice versa.

Each of the tabs (or other graphics images) is selectable. For example, a user may select a tab by clicking on the tab using a mouse or other selection device, or by typing a selection using a keyboard.

In accordance with one embodiment of the present invention, the second tier 104 remains invisible until a user selects a tab of the first tier 102 by clicking on the tab using a mouse or other selection device, or by typing a selection using a keyboard. Once the user selects a tab of the first tier 102, the second tier 104 becomes visible. The second tier 104, also known as a beta tier, includes several tabs 120-128.

As shown in FIG. 1, each of the tabs 120-128 of the second tier 104 is assigned a category that falls within a larger category associated with the selected first tier tab. For example, if the tab 112 (assigned the letter "A") in the first tier 102 is selected, then a tab 120 of the second tier 104 is labeled "Adhesives," and a tab 122 of the second tier 104 is labeled "Art/Drafting." For example, if the tab 119 (assigned the letter "P," but not shown in FIG. 1 until the first tier 102 is scrolled to display it) in the first tier 102 is selected, then the a tab 120 of the second tier 104 is labeled "Printers," and a tab 122 of the second tier 104 is labeled "Palettes."

It will be recognized that one or more of the tabs 120-128 may be replaced with any graphics image including an icon, a JPEG image, a GIF image, text message, or other graphics image. For example, if the tab 112 (assigned the letter "A") in the first tier 102 is selected, then the tab 120 of the second tier 104 may be labeled with an image of a roll of tape to represent adhesives. If the tab 119 (assigned the letter "P," not shown in FIG. 1) in the first tier 102 is selected, then the tab 120 of the second tier 104 may be labeled with an image of a printer to represent printers.

In accordance with another embodiment of the present invention, the tabs 120-128 of the second tier 104 are visible in outline, as vacant tabs, until a user selects a tab of the first tier 102. When the user selects the tab 112 (assigned the letter "A") in the first tier 102, for example, then a label "Adhesives" appears within tab 120, and a label "Art/Drafting" appears within the tab 122 of the second tier 104. When the user selects the tab 119 (assigned the letter "P") in the first tier 102, then a label "Printers" appears within the tab 120, and a label "Palettes" appears within the tab 122 of the second tier 104.

In accordance with one embodiment of the present invention, the second tier 104 is scrollable. In other words, the second tier 104 may include additional second tier tabs that are not shown. A user may scroll the tabs 120-128 to the left or to the right. As the user scrolls the tabs 120-128, the additional second tier tabs become visible.

In accordance with one embodiment of the present invention, the second tier 104 is visually scalable so that as the user enlarges or reduces the size of the second tier 104, the size of the tabs enlarges or reduces as well. In accordance with another embodiment of the present invention, the second tier 104 is visually stretchable so that as the user enlarges or reduces the size of the second tier 104 in a second direction, the size of each tab remains unchanged and number of tabs of the second tier 104 that is visible increases or reduces.

The second tier 104 is separable from the third tier 106, and the image window 108, and may be moved about on the screen using a graphical user interface. Moreover, the second tier 104 may be oriented in either a vertical direction or a horizontal direction. Using the graphical user interface, a user may change the orientation from the vertical direction to the horizontal direction, or vice versa.

Each of the tabs (or other graphics images) is selectable. For example, a user may select a tab by clicking on the tab using a mouse or other selection device, or by typing a selection using a keyboard.

In accordance with one embodiment of the present invention, the third tier 106 remains invisible until a user selects a tab of the second tier 104 by clicking on the tab using a mouse or other selection device, or by typing a selection using a keyboard. Once the user selects a tab of the second tier 104, the third tier 106 becomes visible. The third tier 106, also known as a gamma tier, includes several tabs 130-138.

As shown in FIG. 1, each of the tabs 130-138 of the third tier 106 is assigned a page number of the catalog. The page number is identified with a subcategory of products that falls within a larger category associated with the selected second tier tab. For example, if the tab 120 of the second tier 104 includes a text message, icon, or other graphics image representing adhesives and is selected, then the third tier includes a tab 130 that is labeled with page numbers of the catalog associated with adhesives. If the tab 122 of the second tier 104 includes a text message, icon, or other graphics image representing art and drafting supplies and is selected, then the third tier includes a tab 130 that is labeled with a page number of the catalog associated with art and drafting supplies. Bottom tier tabs are individually numbered tabs representing individual catalog pages. Alternately, these tabs may have a "p" or "page" associated with the number to indicate a page number.

If the tab 120 of the second tier 104 includes a text message, icon, or other graphics image representing printers and is selected, then the third tier includes a tab 130 that is labeled with a page number of the catalog associated with printers. If the tab 122 of the second tier 104 includes a text message, icon, or other graphics image representing palettes and is selected, then the third tier includes at least one tab 130 that is labeled with a page number of the catalog associated with palettes. There may be more than one tab of page numbers associated with a second tier selection.

In accordance with another embodiment of the present invention, the tabs 130-138 of the third tier 106 are visible in outline, as vacant tabs, until a user selects a tab of the first tier 102. When the user selects a tab of the first tier 102, the tabs of the third tier 106 becomes labeled. In accordance with yet another embodiment of the present invention, the tabs 130-138 of the third tier 106 are visible in outline, as vacant tabs, until a user selects a tab of the second tier 104. When the user selects a tab of the second tier 104, the tabs of the third tier 106 becomes labeled. When a tab of the third tier 106 becomes labeled, a text message appears identifying the page number of the catalog associated with the selected items.

The selected category and subcategory may be associated with a large number of pages. In accordance with one embodiment of the present invention, the third tier 106 is scrollable. In other words, the third tier 106 may include additional third tier tabs that are not shown. A user may scroll the tabs 130-138 to the left or to the right. As the user scrolls the tabs 130-138, the additional third tier tabs become visible.

In accordance with one embodiment of the present invention, the third tier 106 is visually scalable so that as the user enlarges or reduces the size of the third tier 106, the size of the tabs enlarges or reduces as well. In accordance with another embodiment of the present invention, the third tier 106 is visually stretchable in at least one direction so that as the user enlarges or reduces the size of the third tier 106 the size of each tab remains unchanged and number of tabs of the third tier 106 that are visible increases or reduces.

In accordance with another embodiment of the present invention, each of the tabs 130-138 of the third tier 106 is implemented as a control such as an active-X control. The third tier 106 is separable from the second tier 104 and the image window 108, and may be moved about on the screen using a graphical user interface. Moreover, the third tier 106 may be oriented in either a vertical direction or a horizontal direction. Using the graphical user interface, a user may change the orientation from the vertical direction to the horizontal direction, or vice versa.

Each of the tabs (or other graphics images) is selectable. For example, a user may select a tab by clicking on the tab using a mouse or other selection device, or by typing a selection using a keyboard.

In accordance with another embodiment of the present invention, the user may use a dialogue box to conduct a search for a text term. For instance, the customer may wish to find a specific part number of an Acme Company part. By using the dialogue box, the customer may search for product by name, by manufacturer, or by part number. When the requested part is identified, it will be displayed in the image window. If the customer asked for a specific model of laser printer, for example, the page of the catalog containing the printer would be displayed in the image window 108; the page number tabs for the sets of pages having laser printers would be displayed in the third tier 106; the various types of printers would be displayed in the second tier; and the letter "P" tab would be displayed along with neighboring letters in the first tier. The text search permits a customer to view the same catalog page or pages as would be found by selecting "P" for printer in the first tier, then selecting "Laser Printer" in the second tier, and selecting a specific page number tab from the third tier.

It will be recognized that the screen object of FIG. 1 is organized to aid a user in navigating the catalog to arrive at a desired page. Accordingly, additional cross-references may be included. For example, in accordance with one embodiment of the present invention, the second tier 104 includes a tab identifying a manufacturer of a printer and also includes a tab associated with the printers generally. If a name of a manufacturer of printers begins with "L", such as Lexmark, then both a tab identifying the manufacturer and a tab generally appear when the user selects the tab labeled "L" in the first tier 102. In accordance with another embodiment of the present invention, only categories, and not manufacturers, are included in the second tier 104 when the user selects a tab of the first tier 102. However, even in such embodiment, a search function as described in the paragraph above allows the user to search for products associated with a manufacturer.

Additional tiers may be added, and that at least one tier may be omitted, where such additional or omission aids the user in navigating to the appropriate page or pages.

Although not shown in FIG. 1, in accordance with another embodiment, a fourth tier is also included. Further tiers may also be added as needed. In accordance with one embodiment of the present invention, the fourth tier remains invisible until a user selects a tab of the third tier by clicking on the tab using a mouse or other selection device, or by typing a selection using a keyboard. Once the user selects a tab of the third tier, the fourth tier becomes visible. The fourth tier includes several tabs (not shown in the figure). Each of the tabs of the fourth tier of the fourth tier is assigned a category that falls within a larger category associated with the selected third tier tab.

In accordance with one embodiment of the present invention, the first tier is divided into portions. For example, when the catalog is used to purchase motor vehicles, one portion of the first tier is used to present types of motor vehicles and another portion is used to represent ranges of prices. In the first portion, each tab is labeled with a category of motor vehicle (van, truck, sports car, etc.) while in another portion each tab is labeled with a range of prices ($1-$10,000, $10,001-$20,000, $20,001-$30,000, etc.) When a customer selects a tab in the first portion of the alpha tier (for example, sports cars), the second tier is modified as necessary to include a tab to subcategories of sports cars (two door, high performance, import, etc.). When a customer selects a tab in the second portion of the alpha tier (for example, the $10,001-$20,000 price range), the second tier is modified as necessary to include a tab to subcategories of such price range. The second tier may be modified to include a tab to a $10,001-$12,000 price range, a tab to a $12,001-$14,000 price range, and a tab to a $14,001-$16,000 price range. Financing terms may also be included in the second tier.

The tabs need not be labeled only with text. Graphics and even video may be included. For example, when the catalog is used to purchase motor vehicles and one portion of the first tier is used to present types of motor vehicles, each tab in the first portion may be labeled with a stick-figure representation of a type of motor vehicle (van, truck, sports car, etc.) or with a photograph of such a type of motor vehicle. This may be particularly helpful with an international clientele, which may not speak exclusively any one language. Instead of a stick figure or photograph, an active-GIF image or streaming-video image of the vehicle, spinning or driving, may be included.

The use of graphics within some of the tabs does not preclude the use of text in other tabs, at the same tier or in other tiers. Some tabs may have both text and graphics. For example, a customer desiring to purchase a Hewlett Packard laser printer, but who does not know the precise model number, may find a tab in the second tier that includes both the name of a manufacturer (Hewlett-Packard) and a graphic image representing the manufacturer's logo.

Any one or more of the tabs of the fourth tier may be replaced with any graphics image including an icon, a JPEG image, a GIF image, text message, or other graphics image. In accordance with another embodiment of the present invention, the tabs of the fourth tier are visible in outline, as vacant tabs, until a user selects a tab of the third tier. In accordance with one embodiment of the present invention, the fourth tier is scrollable. In other words, the fourth tier may include additional fourth tier tabs that are not shown. A user may scroll the tabs of the fourth tier to the left or to the right. As the user scrolls the tabs of the fourth tier, the additional fourth tier tabs become visible.

In accordance with one embodiment of the present invention, the fourth tier is visually scalable so that as the user enlarges or reduces the size of the fourth tier, the size of the tabs enlarges or reduces as well. In accordance with another embodiment of the present invention, the fourth tier is visually stretchable so that as the user enlarges or reduces the size of the fourth tier in a second direction, the size of each tab remains unchanged and number of tabs of the fourth tier that is visible increases or reduces. The fourth tier is separable from the other tiers and the image window 108, and may be moved about on the screen using a graphical user interface. Moreover, the fourth tier may be oriented in either a vertical direction or a horizontal direction. Using the graphical user interface, a user may change the orientation from the vertical direction to the horizontal direction, or vice versa. Each of the tabs (or other graphics images) is selectable. For example, a user may select a tab by clicking on the tab using a mouse or other selection device, or by typing a selection using a keyboard.

In accordance with one embodiment of the present invention, the lower tiers (i.e., the tiers beyond the alpha tier) are extensible. In other words, such tiers may appear only when certain tabs of a higher tier are selected. For example, some types of products require additional categorization. There may be only a few types of clipboards, for example, and several hundred types of pens. When a customer desires a clipboard, selecting "C" at the alpha tier and "Clipboards" at the beta tier cause a third tier to appear that provides tabs to the catalog pages showing clipboards. But when customer desires a pen, selecting "P" at the alpha tier and "Pens" at the beta tier, the user may select "ball point pens," "felt tipped pens," "fountain pens," "refillable pens," etc. at the third tier. Selecting one of the tabs in the third tier causes a fourth tier to appear that provides tabs to the catalog pages showing pens. Accordingly, the fourth level appears when pens are selected, but does not appear when clipboards are selected.

Mini-Catalog

When a customer has a particular interest or intends to make frequent purchases within a given category, the customer may create a mini-catalog. One type of mini-catalog is a flagged mini-catalog. In a static flagged mini-catalog, the customer has marked (or "flagged") certain products as being of particular interest. Thereafter, when the customer uses the mini-catalog, only the flagged records are retrieved by queries. This is of particular interest to customers interested in a particular line of products, or who prefer certain manufacturers, yet who purchase from large wholesalers' catalogs or resellers' catalogs.

A file indicating which products are flagged may be stored on a client machine at the customer's location (for example, in a "cookie"), or may be stored in a table within the database itself. The file may, for example, include pointers to locations within the database, allowing the service provider to update information within the records themselves. This additional personalization may be linked with other client management software to provide customers with a highly personalized purchasing experience.

Another type of mini-catalog is a download mini-catalog. In a download mini-catalog various records of the product database are copied to another location, for example to a client machine at the customer's location. The client is thereafter able to access these records very quickly. The customer may be permitted to access the database periodically and download updates to the database. This may be of particular interest to customers who may not have high-speed connections to a server where the database is stored, or who need to evaluate several purchasing options before actually making a purchase.

Although not strictly a mini-catalog, in accordance with one embodiment of the present invention, the database also includes an active agent to provide an active interface with the customer. The agent, also referred to as a "bot," is able to perform a search of the entire database. Accordingly, each tab is actually an interface with an instance of the agent. When a customer selects a tab, the agent associated with that tab performs a search within the entire database as it exists at that moment in time. The agent determines whether a lower tier is indicated, and if so, updates such lower tier to allow the customer to continue drilling down into the database. The agent automatically builds the database, creating lower tiers as necessary, placing tabs in such lower tiers, and associating such tabs with still more instances of the agent.

The agent may be particularly useful in databases that are updated frequently, such as commodities or the stock market, and which are accessed locally or over high-bandwidth connections. The agent may be highly adaptive, and may interact with other customer management software residing within the database itself or within the customer's client software. Such active searching may require additional bandwidth between the client and the database server when the database is accessed remotely. However, particularly when the database resides on the same machine as the agent, there need be no appreciable latency.

In accordance with one embodiment, a browser function is also included. The browser function allows the customer to store pointers to various catalogs that reside locally or remotely on a PC, server, or website. Each catalog accessible from the browser is typically associated with a browser button or access method such as list of selectable items. When a catalog is selected, such as by pressing a browser button, the browser accesses the appropriate catalog. Additional catalogs can be added through a save function which permits future access to the catalog. If the customer software is not loaded, the browser loads and launches the software in response to the use selected an appropriate browser button.

In a similar embodiment of the present invention, an additional tier above the alpha tier is included. The additional tier above the alpha tier allows the customer to select a catalog (that is, select a database). The browser or other client software, or other software executed by the customer, configures the browser according to the particular catalog that the customer selects.

Database Records

FIG. 2 shows a tabular representation of several records selected from a portion of database, in accordance with one embodiment of the present invention. The tabular representation includes a record 202, associated with a Hewlett Packard laser printer model 500cp. The record 202 includes a first field 204 that contains an item number. The item number is unique for each record within the database. The record 202 also includes a second field 206 that contains a product type. The product type includes a plurality of terms that describe e.g. the Hewlett Packard laser printer model 500cp. Specifically, the product type includes "printer," "laser printer," "office equipment," and other descriptions of the Hewlett Packard laser printer model 500cp. If desired, the product type may also include manufacturer information.

In accordance with one embodiment of the present invention, each of the terms included within the product type has a tier flag associated therewith. For example, the tier flag associated with the term "printer" may be set to 2, and tier flags associated with the terms "laser printer," "office equipment,"

and other descriptions of the Hewlett Packard laser printer model 500cp may be set to 1. As shown in FIG. 2, each tier flag that is set to 2 is indicated by an asterisk.

Each record also includes a manufacturer field 212, a part number field 208, a page number field 210, and an image file pointer field 214. It should be recalled that, in the corresponding paper catalog, each page of the catalog contains several photographic images. The manufacturer field 212 identifies the manufacturer of the item identified by the record, and the part number field 208 identifies a part number assigned by the manufacturer to the item identified by the record. The page number field 210 contains the page number on which the item identified in the record appears in the corresponding paper or electronic catalog. This can easily be simulated in accordance with one embodiment of the present invention. However, the described embodiment of the present invention, additional features may also be added. For example, in addition to the photographic images, interactive scripts can be included. As explained further herein, in accordance with one embodiment of the present invention, each page number points to a plurality of images, including JPEG (Joint Photographic Experts Group) images, GIF images, bitmap images, TIFF images, MPEG (Motion Picture Expert Group) images, or other computer-readable images such as JBIG (Joint Bi-Level Images Experts Group) images and non-text images such as .xls, .dbs, etc.

Some records may require additional fields to express all of the categories to which the corresponding products belong. For example, in the example of an extensible database provided above, the records describing clipboards require only an identification to the second-tier tab labeled as "Clipboards," while the records describing pens require an identification both to the second-tier tab labeled as "pens" and also to a third-tier tab further defining the type of pen the record describes.

In accordance with another embodiment of the present invention, the user may use a GOTO box to conduct a search for a specific page. For instance, the customer may know that a desired product is on page 92 of the catalog, and input "92" in a GOTO box. Upon receipt of this request, page 92 will be displayed, and the tier displays will be adjusted to reflect path to the requested page.

Flowchart for Generating Database

The discussion of FIG. 1 was presented from the customer's perspective in using an embodiment of the current invention. The description below describes the invention from the perspective of the technician who produces electronic catalogs from another embodiment of the invention.

FIG. 3 shows a flow chart of a process for generating a three-tier database interface based upon a database, in accordance with one embodiment of the present invention. The three-tier database interface includes an alternate database organization, used to generate the screen object of FIG. 1. Each record of the database includes a product type field having a plurality of terms, one of which has a tier flag of 2. The process of FIG. 3 creates a tree data structure that is used to organize the records of the database.

The database is, for example, a 20,000 item, office products catalog database of products. The method begins at step 250 and proceeds to step 252 in which a database is accessed. At step 254, a file is selected. In accordance with one embodiment of the present invention, the file is a dedicated file that is selected each time the method is executed. In accordance with a second embodiment of the present invention, the file is selected in response to received user input. If desired, the user input may be received via a drop-down menu presented by a form.

At step 256, the file is loaded (i.e., copied into a system memory) and at step 258 the file is validated. At step 260, the file is sorted. At step 262, presentation groups are created. At step 264, the method terminates.

Flowchart for Building a Database: Loading and Validating

Figure 4:
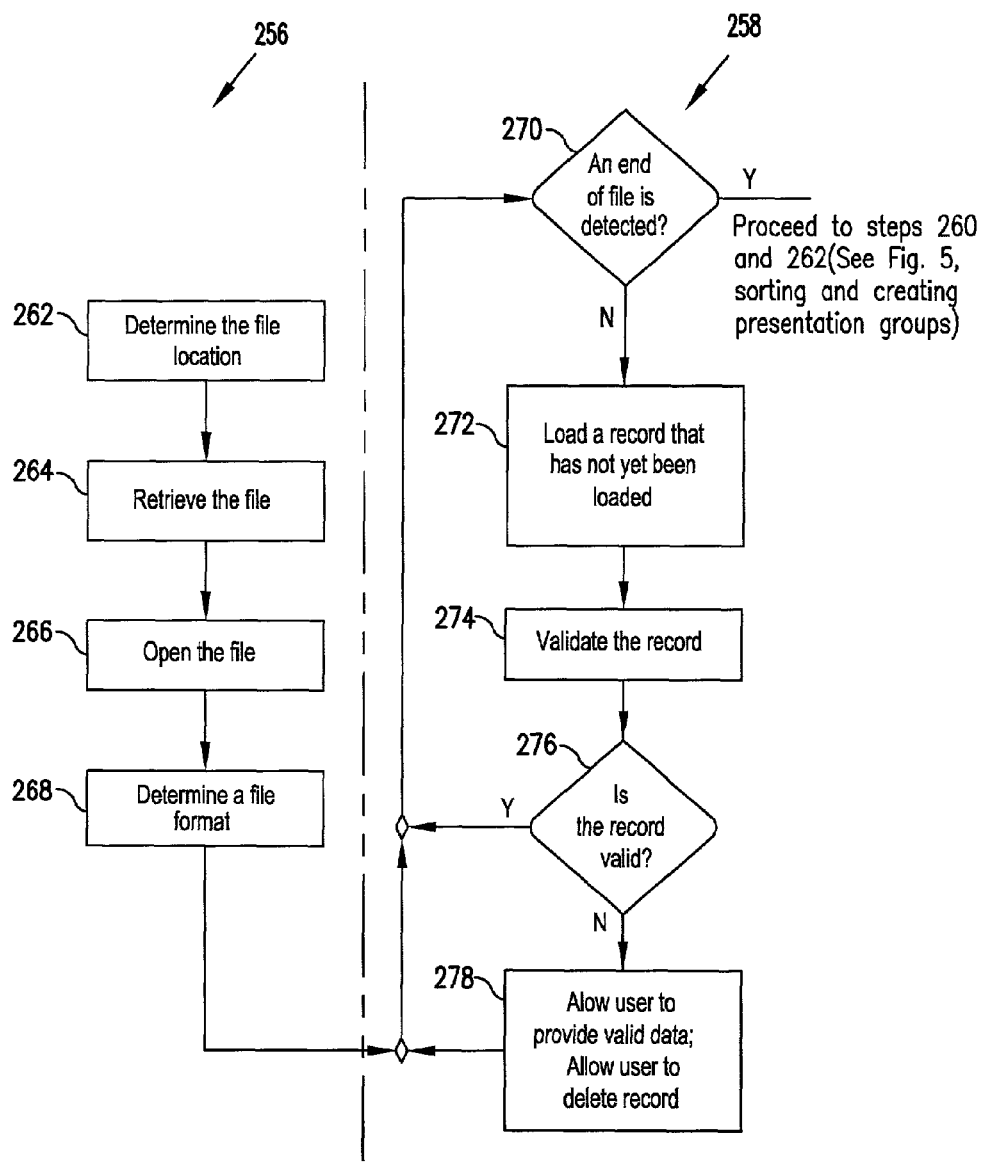
FIG. 4 shows the steps of FIG. 3, in which a file is loaded and validated, in greater detail.

FIG. 4 shows the steps 256 and 258 of FIG. 3, in which a file is loaded and validated, in greater detail. The method begins at step 300 and proceeds to step 302, in which a file is located. The selection of a type of catalog building process is received from the technician building the database, via a graphic user interface. The type of catalog building process is, for example, manual or automatic.

At step 262, the file location is determined. The file location may be determined via a user interface, or may be determined by a default setting. In accordance with one embodiment of the present invention, the file location is within a local computer system mass storage device, such as read only memory, random access memory, cache memory, floppy disk memory, hard drive or hard disk memory, floppy drive or hard disk memory, zip drive memory, magnetic tape memory, CD memory, DVD memory, magnetic tape, and/or any device that stores digital information which can be read from or written to by a computer processor. The technician updates the database as needed via the local computer system. In accordance with another embodiment of the present invention, the file location is within a remote computer system, coupled to a local computer system via a local area network, wide area network, or the Internet. Specifically, in accordance with one embodiment of the present invention, the local computer is a desktop computer system located at a technician's place of business, and the remote computer system is an Internet server farm located at a central location and coupled to the local computer via the Internet. The technician updates the database as needed by logging onto the Internet server farm remotely and entering information as needed.

It will be recognized that the file location need not be stored in only one location. In accordance with one embodiment of the present invention, the file location is actually distributed. Each product manufacturer maintains a separate database that conforms to a standard protocol and that is accessible by the technician's local computer system. The technician accesses each manufacturer's database to download information as needed to build the online catalog. In accordance with one embodiment of the present invention, the technician's local computer system automatically detects changes in the manufacturer's database, or is notified when the manufacturer's database is changed, and automatically downloads information to build the online catalog.

Throughout the present description, the terms "database," "catalog," and "file" will be used interchangeably. It will be recognized that the file (or files) is a data structure for storing a database, and that the catalog is a more abstract ("user friendly") term for describing the database. Similarly, the terms "product" and "item" are used interchangeably, since the items identified in the database are products listed in the catalog.

At step 264, the file is retrieved. The retrieval of the file may be regarded as a downloading of the database to the technician's local computer system. As stated previously, the technician's local computer system may be an Internet server or Internet server farm that is accessible over the Internet.

At step 266, the file is opened. And at step 268 a file format is determined. For example, the file may be stored in tab-delimited text, paragraph-delimited text, or other text formats. In accordance with one embodiment of the present invention, the file format may be read directly from the file or from a registry, or may be determined from a file type extension.

At step 270, the system determines whether an end of file indicator has been detected. If no end of file indicator has been detected, then at step 272 a record that has not yet been loaded is loaded. At step 274 the record is validated. For example, the record is examined to determine whether any required fields are empty or contain a value that contradicts certain validation rules. The rules themselves are modifiable.

At steps 276-278, if the record is not valid, then at step 278 the system performs an interactive process, notifies the technician that a record is not valid and allowing the technician to provide valid data. The interactive process also allows the user to remove the record from the database, at least until valid information may be obtained.

Flowchart for Building a Database: Sorting

Figure 5:
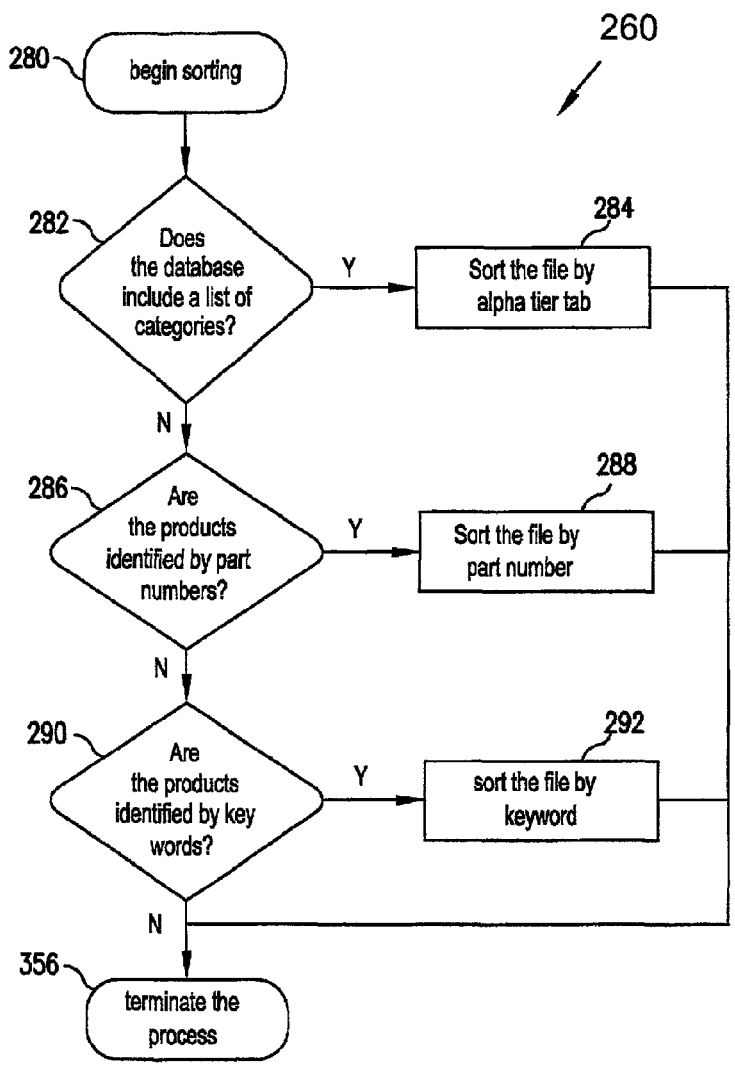
FIG. 5 shows the step of FIG. 3, in which a file is sorted, in greater detail.

FIG. 5 shows the step 260 of FIG. 3, in which a file is sorted, in greater detail. At step 280, the process of sorting the file begins. It will be recalled (from step 268 of FIG. 4) that the file may be stored in tab-delimited text, paragraph-delimited text, or other text formats. In accordance with one embodiment of the present invention, the file format may be read directly from the file or from a registry, or may be determined from a file type extension.

In accordance with one embodiment of the present invention, the file format may be converted from one format to another. For example, a portion of the file may be stored as tab-delimited text, and another portion of the file paragraph-delimited text. Different file formats may be more appropriate than others for different types of products, or different manufacturers. The process of FIG. 5 converts the formats to a uniform format as needed.

At step 282, the product type field (i.e., the second field 206 of FIG. 2) is examined, and a determination is made whether the database includes a list of categories. For example, the database may include data within the product type field. The database includes a list of categories when the product type field of each record indicates a category to which the record belongs. At step 284, if the database includes a list of categories, then the file is sorted by alpha tier tab.

It may be that the database does not contain a list of categories. For example, if products or items in the database do not share characteristics, then the database does not contain a list of categories. At step 286, the part numbers of each record (i.e., the part number field 208 of FIG. 2) is examined, and a determination is made whether the products are identified by part numbers. At step 288, if the products are identified by part numbers, then at step 288 the file is sorted by part numbers.

If the database does not include a list of categories and the products listed in the database are not identified by part numbers, then at step 290 all fields are examined for keywords. A keyword is any alphanumerical text that may be interpreted as a word. For example, a manufacturer's name is a keyword. Also, words such as "printer" and part numbers such as "HP500CP" are keywords. At step 292, if the database does not include a list of categories and the products listed in the database are not identified by part numbers, then the file is sorted by keyword.

Figure 5B:
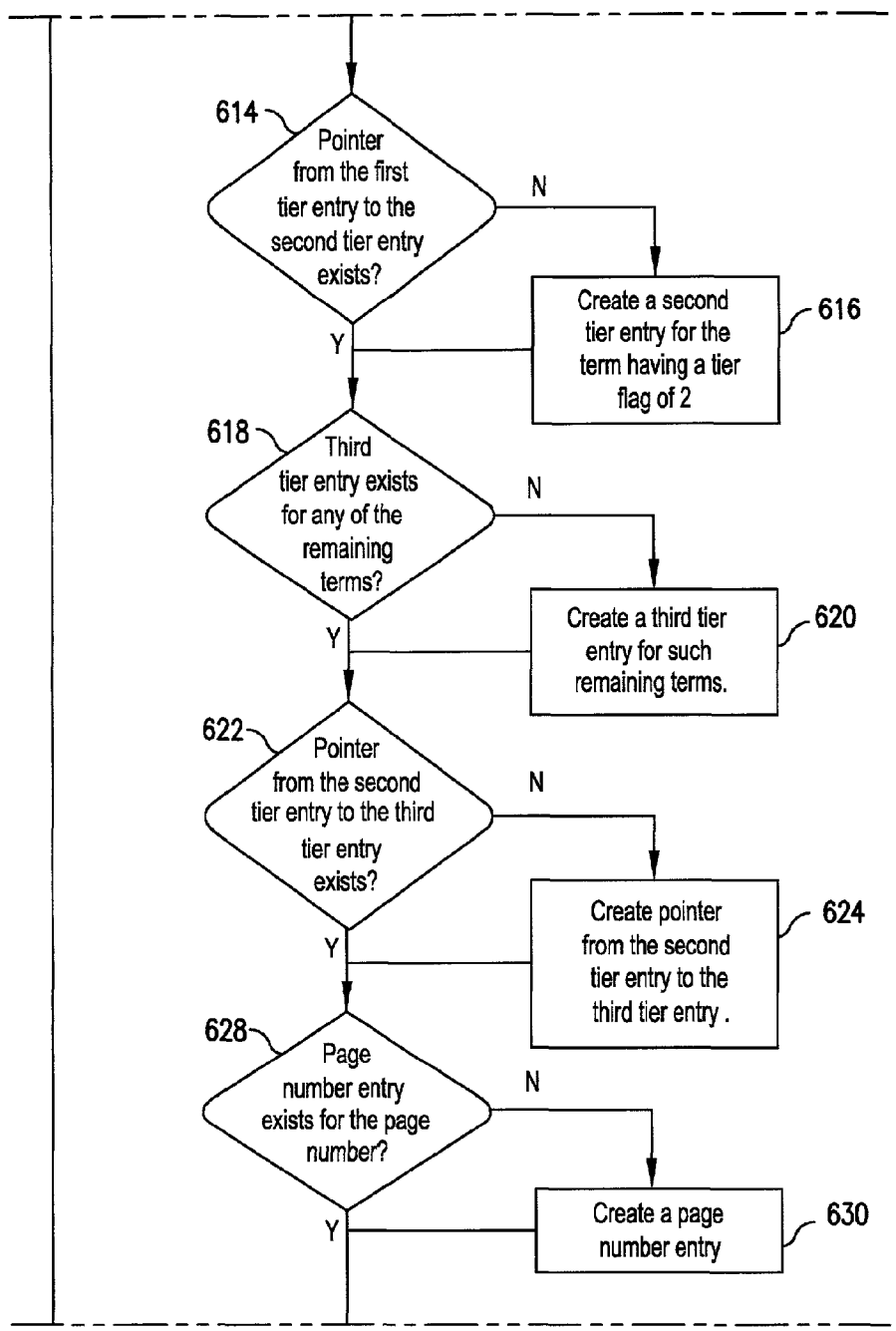
FIG. 5B shows additional actions regarding aspects of FIG. 5.
Figure 5C:
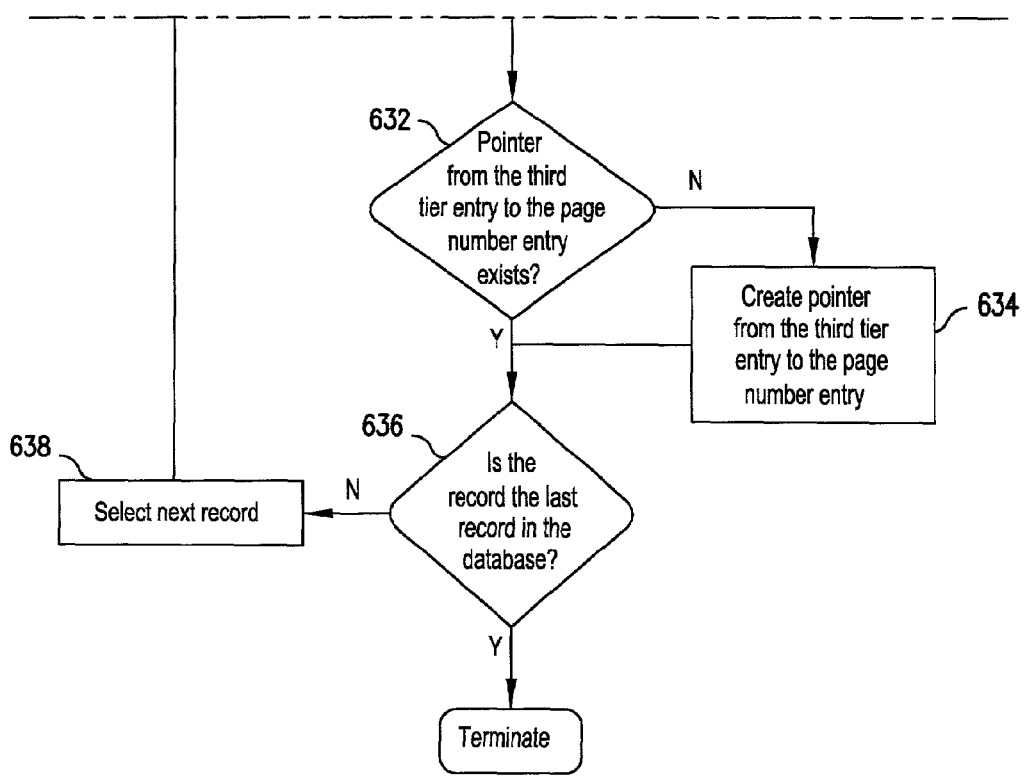
FIG. 5C shows additional actions regarding aspects of FIG. 5.

FIGS. 5A through 5C shows the steps 284, 288, and 292 of sorting the file in greater detail. At step 602, a tree structure is created, and a first tier entry is created for each letter of the alphabet. If desired, other first tier entries may be created for various categories, and letters of the alphabet may be grouped to form first tier entries.

At step 604, a first record of the database is accessed. At step 606, the terms of the product type field of the record are examined, and the term having a tier flag of 2 is identified. At steps 608-610, if no second tier entry exists for the term having a tier flag of 2, then a second tier entry is created for the term having a tier flag of 2.

At steps 612, the first letter of the term having the tier flag of 2 is determined. The first letter identifies a first tier entry. At steps 614-616, if no pointer from the first tier entry to the second tier entry exists, such a pointer is created.

At step 618, the remaining terms of the product type field of the record are examined. At steps 618-620, if no third tier entry exists for any of the remaining terms, then a third tier entry is created for such remaining terms.

At step 622, the first remaining term is examined. After steps 618-620, a third tier entry exists for the first remaining term. At steps 622-624, if no pointer from the second tier entry to the third tier entry exists, such a pointer is created.

At step 626, the page number field of the record is examined. At steps 628-630, if no page number entry exists for the page number, then a page number entry is created. After steps 628-630, a page number entry exists for the page number associated with the record. At steps 632-634, if no pointer from the third tier entry to the page number entry exists, such a pointer is created.

At steps 636-638, if the record is not the last record in the database, then the next record is selected, and the process returns to step 606.

Flowchart for Building a Database: Creating Presentation Groups

Figure 6B:
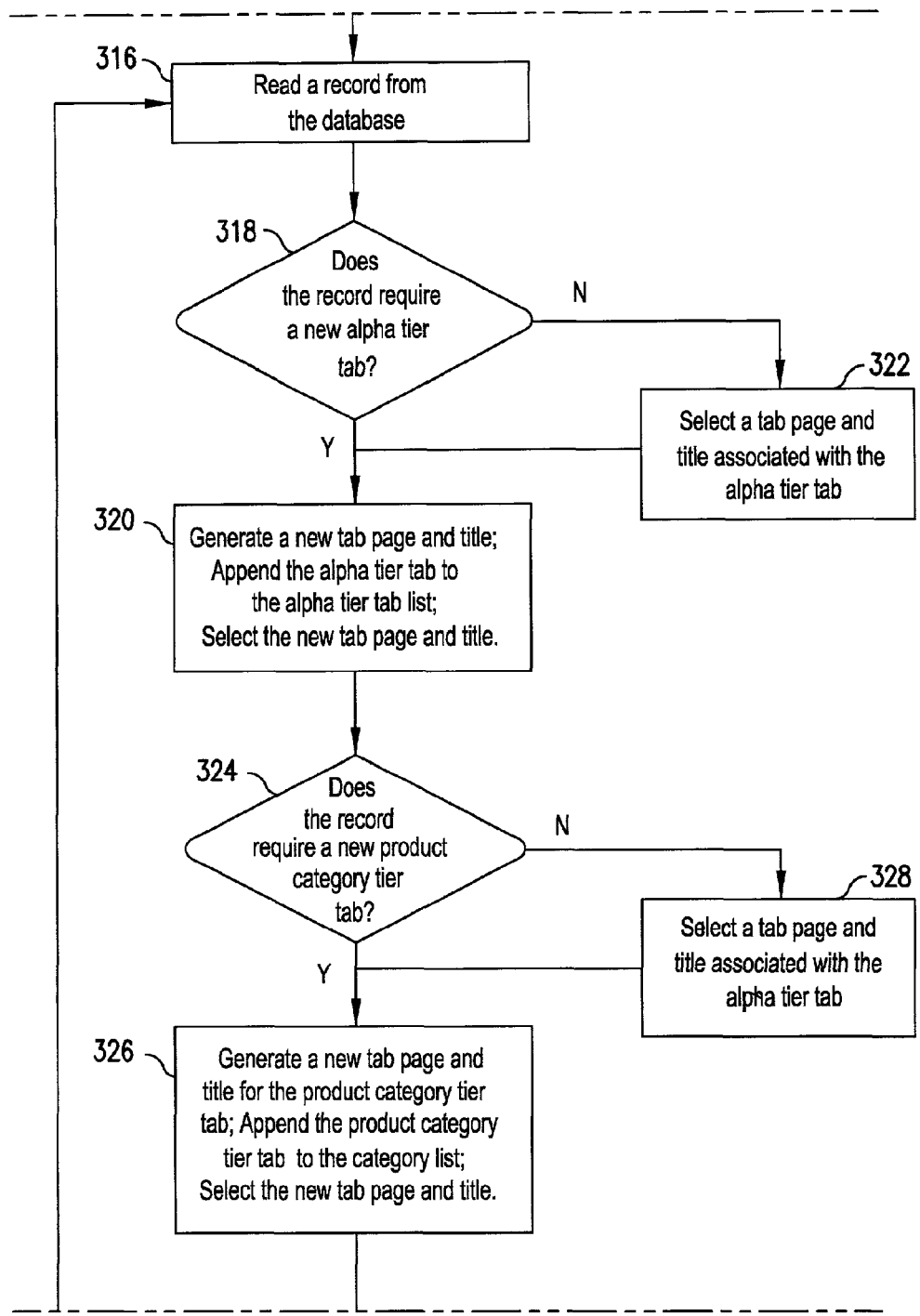
FIG. 6 shows a flowchart of a process for performing the step of FIG. 3, in which presentation groups are created, in greater detail.
Figure 6C:
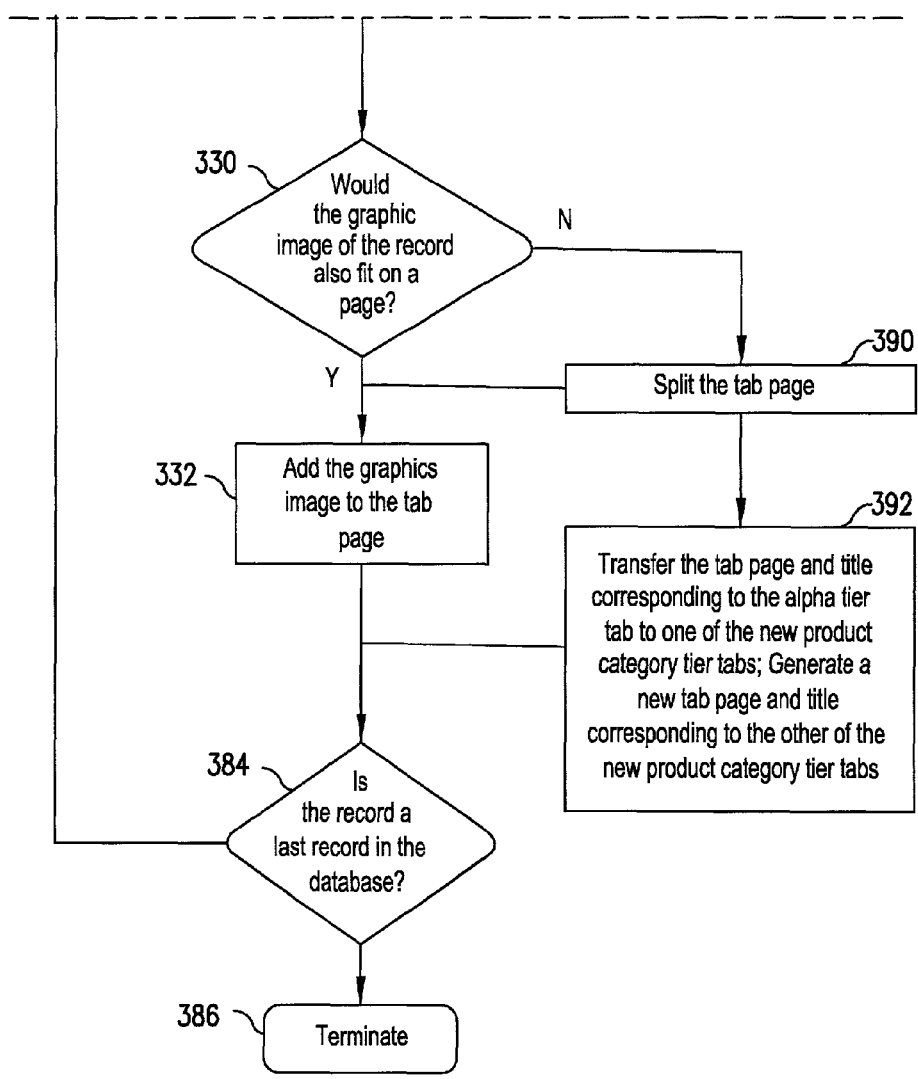

FIG. 6 shows a flowchart of a process for performing the step 262 of FIG. 3, in which presentation groups are created, in greater detail. The process begins at step 300 and proceeds to step 302, in which a selection of a type of catalog building process is received. The selection of a type of catalog building process is received from the user building the database, for example via a graphic user interface. If desired, the selection of a type of catalog building process may be a default setting on the user's computer system.

At step 304, a determination is made whether the catalog building process is automatic. The remainder of FIG. 6, including steps 308-386, are applicable if the catalog building process is automatic. If at step 304 the type of catalog building process is not automatic, then at step 306 another catalog building process is performed. Step 306 is particularly applicable if, for example, the database contains several products that could be included on a page, but the user desires that the products be shown individually (one to a page). Accordingly, step 306 is particularly applicable if the user desires to override the automatic catalog building process available via steps 308-386.

If the type of catalog building process is automatic, then at step 308 the size of an image window 108 (of FIG. 1) is received from the user building the database via a graphic user interface. The size of the image window 108 may be in inches, pixels, centimeters, or other units, as selected by the user via the graphic user interface.

At step 310, if the catalog building process is automatic, then the image window 108 size is used to calculate a horizontal image window 108 size and a vertical image window 108 size. The horizontal image window 108 size and vertical image window 108 size are the horizontal and vertical lengths of the image window 108 of FIG. 1.

At step 312, if the database is not yet loaded, then the database is loaded.

At step 314, a number of records that can be fit on a page is calculated. The number of records is determined by dividing the size of the image window 108 by the size of a representative image. It should be recalled that, in the corresponding paper catalog, each page of the catalog contains several photographic images. The image file pointer field 214 identifies a location in the file where the image of the product, such as a JPEG (Joint Photographic Experts Group) image, GIF image, bitmap image, TIFF image, MPEG (Motion Picture Expert Group) image, or other computer-readable images such as JBIG (Joint Bi-Level Images Experts Group) images and non-text images such as .xls, .dbs, etc. is stored.

At step 316, the record is read from the database. As shown in FIG. 2, the record includes the manufacturer field 212, the part number field 208, the page number field 210, and an image file pointer field 214.

At step 318, a determination is made whether the record requires a new alpha tier tab. To accomplish this step, the process maintains a list of alpha tier tabs of the records that have been read at step 316. The alpha tier tab of a record is the term (or terms), included within the product type field of the record, that has a tier flag that is set to 2 (indicated in FIG. 2 by an asterisk).

If at step 318 it is determined that the record requires a new alpha tier tab, then at step 320 a new tab page and title are generated. The alpha tier tab is appended to the alpha tier tab list, and the new tab page and title are selected.). If at step 318 it is determined that the record does not require a new alpha tier tab, then at step 322 the tab page and title associated with the alpha tier tab is selected.

At step 324, a determination is made whether the record requires a new category tier (i.e., beta tier) tab. To accomplish this step, the process maintains a list of beta tier tabs for each alpha tier tab, of the records that have been read at step 316. The beta tier tab of a record is the term (or terms), included within the product type field of the record, that has a tier flag that is set to 3 (indicated in FIG. 2 by the lack of an asterisk).

If at step 324 it is determined that the record requires a new beta tier tab, then at step 326 a new beta tier tab, new tab page and title is generated. The new beta tier tab is appended to the beta tier tab list, and the new tab page and title are selected. If at step 324 it is determined that the record does not require a new beta tier tab, then at step 328 the tab page and title associated with the beta tier tab of the record is selected.

If the record contains further sub-fields within the alpha tier tab field, then steps similar to steps 322 and 324 are also included. The method continues until a tab page and title associated with each alpha tier tab, product category tier tab, page tier tab category tier tab, etc. of the record are selected. It will be understood that the product category tier tabs associated with an alpha tier tab comprise a "second tier collection" associated with the alpha tier tab. Similarly, page tier tabs associated with a product category tier tab comprise a "third tier collection" associated with the product category tier tab.

At step 330, a determination is made whether the graphic image of the record also fit on the page identified in the page number field of the record. In accordance with one embodiment of the present invention, to accomplish this step, the process maintains a running total of the area already assigned to each page. As each record is examined at step 330, the determination is made whether adding the graphic image of the record would cause the running total to exceed the horizontal image window size and a vertical image window size determined at step 310.

In lieu of the photographic images, interactive scripts or video can be included. However, even interactive scripts may require space within a page. Accordingly, step 330 determines whether the graphic image, which may be an interactive script, can be fit on the page identified in the page number field of the record.

In accordance with another embodiment of the present invention, to perform step 330, the process maintains a running total of the number of images already assigned to each page. As each record is examined at step 330, the determination is made whether adding the graphic image of the record would cause the running total to exceed the number of records that can be fit on a page, as determined in step 314.

If at step 330 it is determined that the graphic image of the record may also fit on the page identified in the page number field of the record, then at step 332 the graphics image is added to the tab page. If at step 330 it is determined that the graphic image of the record cannot also fit on the tab page identified in the page number field of the record, then at step 334 the tab page is split. In other words, the graphic images already assigned to the tab page remain assigned to the tab page; a new tab page is created; the tab page and title corresponding to the alpha tier tab are copied into the new tab page; and the graphic image of the record is placed in the new tab page. Thereafter, all references to the tab page are directed to the new tab page.

At steps 384 and 386, the process terminates when the record is the last record of the database. The steps 316-386, are repeated until an end of file is detected at step 384.

Manual Catalog Building Process

At step 304, a determination is made whether the catalog building process is automatic. If at step 304 the type of catalog building process is not automatic, then at step 306 another catalog building process is performed. The user may select a manual catalog building process, for example if the user desires to override the automatic catalog building process available via steps 308-386.

In accordance with one embodiment of the present invention, the method includes accessing a graphical user interface to facilitate selection of categories. Specifically, the graphical user interface includes a collection of drop-down menus that allow the user to select categories from a predetermined list. If desired, the list may be dynamic, and the user may add, delete, or move entries from the list. In accordance with another embodiment, the graphical user interface allows the user to type the name of each "alpha tier" tab (i.e., category) via a dialog box. In accordance with another embodiment of the present invention, the user uploads the name of each alpha tier tab from a text file.

In accordance with one embodiment of the present invention, the catalog format also includes product tier tab (i.e., subcategories). A large number of product tier tabs corresponding to the selected alpha tier tab are shown. The product tier tabs corresponding to the selected alpha tier tab are shown as a row of tabs parallel and adjacent to the row of alpha tier tabs. The alpha tier tabs, however, remain visible and may be selected. When another alpha tier tab is selected, the product tier tabs are replaced with a large number of product tier tabs corresponding to the newly-selected alpha tier tab.

In effect, the user may assign product types during the catalog building process, rather than relying on product types already within the database. The product types include tabs for each of the tiers. The user may also assign each record to a particular page.

EXAMPLE

An example may be helpful to illustrate steps 384-388. If the record identifies "Art/Drafting" in the beta tier tab field, then the record is added to the "Art/Drafting" beta tier tab. If adding the graphic image of the record to the last tab page associated with the beta tier tab would exceed the number of records that can be fit on a page, then the tab page is split. At step 386, two product category tier tabs are added to the beta tier tab: "Art/Drafting, part I" and "Art/Drafting, part II." A new tab page is created corresponding to each of the new product category tier tabs. At step 388, the contents of the original "Art/Drafting" beta tier tab are transferred to the tab page and title corresponding to the first product category tier tab, "Art/Drafting, part I," and a new tab page and title corresponding are generated corresponding to the other of the new product category tier tabs, i.e. "Art/Drafting, part II". The graphics image of the new record is added to the "Art/Drafting, part II" product category tier tab.

Flowchart For Purchasing Products Using The Online Catalog

Figure 7:
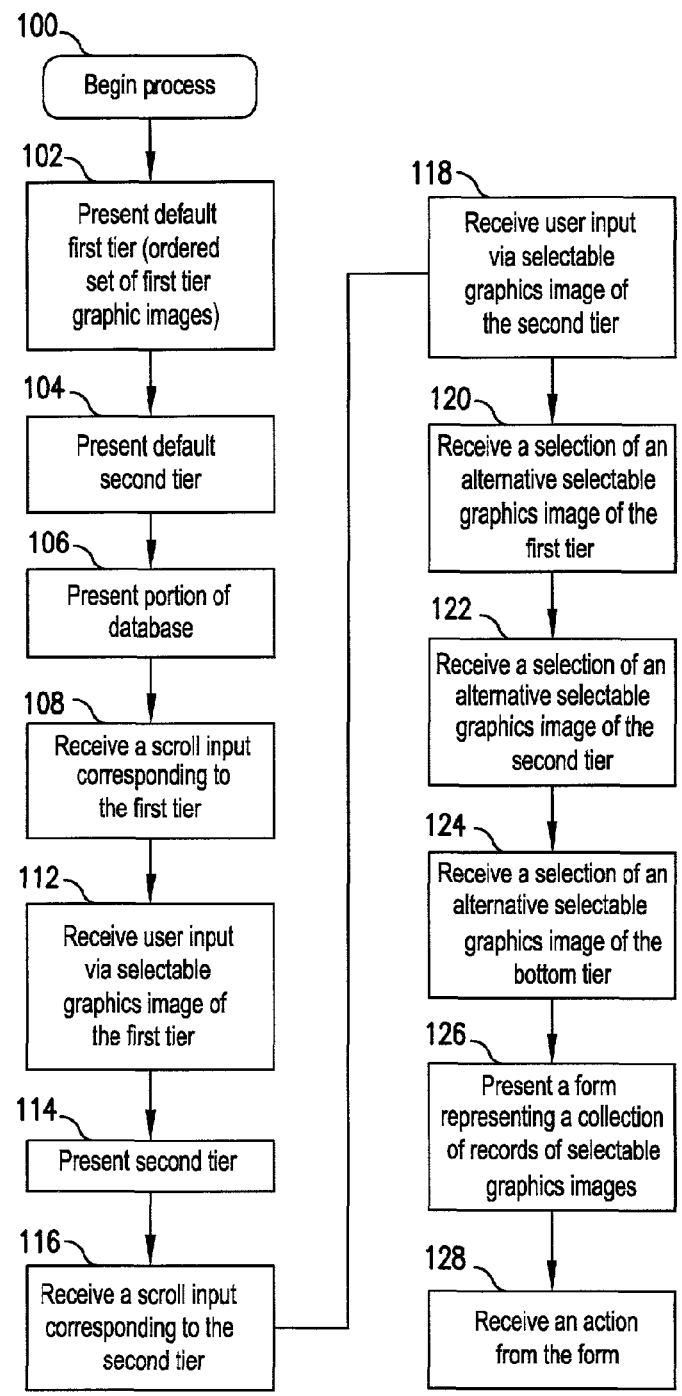
FIG. 7 shows a flowchart for a method for presenting a portion of a database.

FIG. 7 shows a flowchart for a method for presenting a portion of a database to a customer. The method of FIG. 7 may also be used to present the entire database. In accordance with one embodiment of the present invention, the flowchart begins at step 400 in which a database is accessed to provide a default portion of the database. The default portion includes several records that are to be presented when no input has been received from a user. For example, the default portion includes the first four records of the database, when the database is organized alphabetically. In accordance with another embodiment of the present invention, the default portion is empty, and therefore contains none of the records of the database.

At step 402, a first tier of tabs is presented. In accordance with one embodiment of the present invention, the selectable graphic images are tabs. In accordance with another embodiment of the present invention, the selectable graphic images are radio buttons. If desired, the selectable graphic images may be replaced with check boxes, icons, drop down lists, scroll bars, and/or other input element of a graphical user interface.

Each of the tabs (e.g., tabs) in the first tier of tabs represents a collection of data structures. In accordance with one embodiment of the present invention, the first tier has a tab labeled "A" that represents a collection of database records having a name that begins with the letter "A." The collection of database records may be organized as a linked list of database records. The collection of data structures corresponds to the tab (i.e., the tab that is labeled "A"). If desired, the collection of data structures may be a binary tree, an array, a stack, or other collection of data structures. Similarly, each of the data structures includes a plurality of data objects. Each of the data object is, for example, a record.

The tabs of the first tier belong to an ordered set of first tier graphics images. For example, the first tier may contain a tab for each letter in the alphabet. As another example, the first tier may contain a tab for each manufacturer of a product represented by a record within the database. The ordered set of first tier graphics images need not be displayed in its entirety. In another example, the first tier contains a tab for each manufacturer of a product described in a record within the database.

One of the tabs may be identified as a first-displayed first tier graphics image, and a small number of first tier graphics images may be determined beginning with the first-displayed first tier graphics image. For example, step 402 may display only those tabs having the letters of the alphabet between "B" and "K," where the tab labeled "B" is the first-displayed first tier graphics image and such that step 402 displays only a subset of the ordered set of first tier graphics images.

At step 404, in accordance with one embodiment of the present invention, a default second tier is presented. The default second tier includes blank tabs. In other words, the tabs of the default second tier lack text. In accordance with another embodiment of the present invention, the default second tier includes a first group of tabs corresponding to the first selectable graphics image of the first tab in the first tier. In other words, the default second tier includes tabs labeled "Adhesives," "Air Cleaners," "Art/Drafting," etc.

In accordance with one embodiment of the present invention, the tabs of the second tier of tabs are immediately visible. In accordance with another embodiment of the present invention, the tabs of the second tier of tabs are not visible until after one of the tabs of the first tier is selected.

In accordance with yet another embodiment of the present invention, the tabs of the second tier of tabs are partially visible while none of the tab of the first tier have been selected, and then are fully visible after one of the tab of the first tier is selected. "Partially visible" means, for example, that the tab lacks text or is of a different color or shade before a first tier tab is selected, and is therefore different from a second tier tab from the fully visible.

At step 406, the default portion of the database is presented. As stated previously, the default portion may include several records that are to be presented when no input has been received from a user, or the default portion may be empty. Accordingly, the first tier has been presented, a default second tier has been presented, and a default portion of the database has been presented.

At step 408, a scroll input corresponding to the first tier is received. The scroll input is, for example, a mouse clicking on a small button at an end of the first tier, or dragging a scroll bar. If at step 408 the scroll input indicates scrolling to the left, in response to receiving the scroll input, then first tier is scrolled to the right. Specifically, if the first tier displays tabs labeled "B" through "K" and the first tier is scrolled to the right, then the first tier then displays tabs labeled "C" through "L." If at step 408 the scroll input indicates scrolling to the left, then in response to receiving the scroll input, the first tier is scrolled to the left. Specifically, if the first tier displays tabs labeled "B" through "K" and the first tier is scrolled to the left, then the first tier then displays tabs labeled "A" through "J."

One of the tabs may be identified for displaying, and a small number of first tier graphics images may be determined, such that step 402 displays only a subset of the ordered set of first tier graphics images.

At step 412, a selecting of a tab of the first tier is detected. The selecting is, for example, a mouse-click on the tab. If desired, step 412 may also include detecting any user input via one of the selectable graphic images (i.e., the check boxes, icons, drop down lists, scroll bars, and/or other input element of the graphical user interface) belonging to the first tier. Step 412 identifies one of the tabs as a first tier selected graphics image.

In accordance with one embodiment of the present invention, the first tier is presented as a horizontal row of tabs. In accordance with another embodiment of the present invention, the first tier is presented as a vertical column of tabs. In accordance with yet another embodiment of the present invention, a first portion of the first tier is presented as a horizontal row of tabs, and a second portion of the first tier is presented as a vertical column of tabs.

At step 414, a second tier of tabs is presented, replacing the default second tier. The second tier of tabs is selected based upon the first tier selected graphics image. If the first tier selected graphics image is the "A" tab, then the second tier includes tabs labeled "Adhesives," "Air Cleaners," "Art/

Drafting," etc. If the first tier selected graphics image is the "P" tab, then the second tier includes tabs labeled "Printers," etc.

Like the tabs of the first tier, in accordance with one embodiment of the present invention, the selectable graphic images of the second tier are tabs. In accordance with another embodiment of the present invention, the selectable graphic images are radio buttons. If desired, the selectable graphic images may be replaced with check boxes, icons, drop down lists, scroll bars, and/or other input element of a graphical user interface.

In accordance with one embodiment of the present invention, the selectable graphic images of the first tier and the selectable graphic images of the second tier are of the same type. In other words, both the first tier and the second tier comprise tabs. In accordance with another embodiment of the present invention, the selectable graphic images of the first tier are tabs and the selectable graphic images of the second tier are check boxes.

Each of the tabs (i.e., tabs) in the second tier of tabs represents a collection of data structures. The collection of data structures corresponds to the tab. However, each data structure in the second tier also belonging to the first collection of data structures corresponds to the first tier selected graphics image. In other words, the first tier selected graphics image controls which tabs are presented in the second tier.

In accordance with one embodiment of the present invention, the tabs of the second tier are determined directly from the database based upon the first tier selected graphic image. When the database is created, the tabs of the second tier are determined. One or more tabs of the second tier are assigned to each tab of the first tier. However, in accordance with another embodiment of the present invention, the database may obtain information about the user from another database or from a cookie residing on the display computer system. Accordingly, step 414 also includes a step of dynamically creating tabs for each of the tiers. One or more tabs of the second tier are dynamically assigned to each tab of the first tier.

The tabs of the second tier belong to an ordered set of second tier graphics images. The ordered set of second tier graphics images need not be displayed in its entirety. One of the tabs may be identified as a first-displayed second tier graphics image, and a small number of second tier graphics images may be determined beginning with the first-displayed second tier graphics image, such that step 414 displays only a subset of the ordered set of second tier graphics images.

At step 416, a scroll input corresponding to the second tier is received. The scroll input is, for example, a mouse clicking on a small button. If at step 416 the scroll input indicates scrolling to the left in response to receiving the scroll input, then second tier is scrolled to the right. If at step 416 the scroll input indicates scrolling to the left, then in response to receiving the scroll input, the second tier is scrolled to the left.

At step 418, a selecting of a tab of the second tier is detected. The selecting is, for example, a mouse-click on the tab. If desired, step 418 may also include detecting any user input via one of the selectable graphic images (i.e., the check boxes, icons, drop down lists, scroll bars, and/or other input element of the graphical user interface) belonging to the second tier. Step 418 identifies one of the tabs as a second tier selected graphics image.

In accordance with one embodiment of the present invention, the second tier is presented as a horizontal row of tabs. In accordance with another embodiment of the present invention, the second tier is presented as a vertical column of tabs. In accordance with yet another embodiment of the present invention, a first portion of the second tier is presented as a horizontal row of tabs, and a second portion of the second tier is presented as a vertical column of tabs.

The orientation (i.e., horizontal, vertical, or both horizontal and vertical) of the second tier need not depend on the orientation of the first tier. In accordance with one embodiment of the present invention, the first tier and the second tier are both presented as a horizontal row of tabs. In accordance with another embodiment of the present invention, the first tier is presented as a horizontal row of tabs, and the second tier is presented as a vertical column of tabs. Also, the first tier and the second tier need not be displayed near one another, although in accordance with one embodiment of the present invention the first tier and the second tier are adjacent to one another.

In accordance with one embodiment of the present invention, the method includes presenting further tiers of tabs. In accordance with one embodiment of the present invention, the selectable graphic images of each of the further tiers are tabs. Each of the tabs (i.e., tabs) in each of the further tiers of tabs represents a collection of data structures. The collection of data structures corresponds to the tab.

Although not shown in FIG. 7, the method may include detecting a selecting of a tab of each of the further tiers. The selecting is, for example, a mouse-click on the tab. If desired, step 418 may also include detecting any user input via one of the selectable graphic images (i.e., the check boxes, icons, drop down lists, scroll bars, and/or other input element of the graphical user interface) belonging to the each of the further tiers. Each of such steps identifies a selected graphics image from among the tabs of each of the further tiers.

For example, the method may include presenting a third tier of tabs in response to a selecting of a tab of the second tier. If the second tier selected graphics image is a tab labeled "Printers," then the third tier of tabs includes tabs labeled "Laser printers," "Portable printers," "Inkjet printers," etc. Such a selecting would produce a third tier selected graphics image. When included, each tab in the third tier of tabs represents a third collection of data structures. Moreover, each data structure in the third tier also belongs to the second collection of data structures corresponding to the second tier selected graphics image.

In accordance with one embodiment of the present invention, the tabs of the further tier of tabs are immediately visible. In accordance with another embodiment of the present invention, the tabs of the further tier of tabs are not visible until after one of the tab of the second tier is selected.

In accordance with yet another embodiment of the present invention, the tabs of the further tier of tabs are partially visible while none of the tab of the second tier have been selected, and then are fully visible after one of the tab of the second tier is selected. "Partially visible" means, for example, that the tab lacks text or is of a different color or shade before a second tier tab is selected, and is therefore different from a further tier tab from the fully visible.

At step 420, a selecting of an alternative tab of any of the tiers is detected. The selecting of the alternative tab produces a selected alternative tab.

The "further" tiers of tabs include a third tier. For example, the method may include presenting a third tier of tabs in response to a selecting of a tab of the second tier. Such a selecting would produce a third tier selected graphics image. When included, each tab in the third tier of tabs represents a third collection of data structures. Moreover, each data structure in the third tier also belongs to the second collection of data structures corresponding to the second tier selected graphics image.

For example, at step 420, after detecting the selecting of the tab of the first tier, a selecting of an alternative tab of the first tier is detected. The selecting of the alternative tab of the first tier causes the second tier tabs to be replaced with alternative second tier tabs.

At step 424, after one of the alternative second tier tabs is selected, any third tier of tabs that may have been presented is replaced with an alternative third tier of tabs.

The method includes presenting a bottom tier. When the method includes presenting a first tier and a second tier and does not include presenting a third tier, then the second tier is the bottom tier. When the method includes presenting a first tier, a second tier, and a third tier, and does not include presenting a fourth tier, then the third tier is the bottom tier. The method therefore includes presenting a bottom tier of tabs, as shown for example in step 424. The bottom tier includes a plurality of selectable bottom tier graphics images. Each tab in the bottom tier of tabs represents a first collection of data objects corresponding thereto. In other words, rather than representing a collection of tabs at a lower tier, each tab in the bottom tier represents a first collection of data objects.

In accordance with one embodiment of the present invention, the database is designed to mimic a paper catalog, and the bottom tier includes a tab for each page in a catalog. Accordingly, each tab in the bottom tier is labeled with a page number of the paper catalog. Where the paper catalog is divided into section, a tier immediately "above" the bottom tier (in a hierarchy of tiers) has a tab for each section of the catalog.

It will be understood that the hierarchy of tiers includes cross-referencing. A record may belong to several groups. For example, a Hewlett-Packard laser printer may belong to a group of "Hewlett-Packard" products corresponding to a tab labeled "Hewlett-Packard," and also belong to a group of laser products corresponding to a tab labeled "L," to a group of printer products corresponding to a tab labeled "P," and to a group of durable products corresponding to a tab labeled "reusable/non-disposable."

At step 424, in response to a selecting of a tab of the bottom tier to produce a bottom tier selected graphics image, a selected portion of the database is accessed. The selected portion of the database begins with a first selected record of the database and includes as many records as can fit on a page.

At step 426, in response to an accessing of the selected portion of the database, a form representing a collection of records of tabs is presented. The form is presented in a large region and presents several graphic images. Each of the graphic images in the form represents a distinct record in the database. The presenting of the form is more fully described with respect to FIG. 2.

It will be recognized that the tabs of the page are visually scalable. In other words, the form may be expanded or reduced in size, and all of the tabs of the page are expanded or reduced proportionately. Accordingly, the minimum horizontal length and the minimum vertical length may be percentages of the overall horizontal length and vertical length of the form, respectively, rather than absolute lengths.

At step 428, an action is received from the form. The action is, for example, a clicking on a radio button. If desired, the action may be a text entry into a dialog box, a striking of a key on a keyboard, a moving of a mouse, or a receiving of another hardware or software signal. In accordance with one embodiment of the present invention, the action is a text entry. In accordance with one embodiment of the present invention, the action is an entry of a quantity. For example, if a customer wishes to purchase ten items of a product, then the customer may enter "10" into a dialog box. At step 426, a purchase order is generated in response to receiving the action.

As shown in FIG. 7, step 402, step 404, and step 414 display various tiers, step 406 displays a portion of the database, and step 426 displays a form. In accordance with one embodiment of the present invention, the steps of displaying are executed on a display computer system having a processor and a display. The processor is a general purpose CPU (central processing unit) such as a stand-alone microprocessor, micro-controller, digital signal processor (DSP), central processing unit (CPU), a coprocessor, a logic circuit including one or more logic gates, or any device that manipulates digital data based on operational instructions. The processor may also be a distributed group of processors residing within a computer system, or residing in several computer systems coupled to one another via a network. The network may be, for example, a local area network or a wide area network such as the Internet.

In accordance with one embodiment of the present invention, the display computer system executes a browser and a browser plug-in for displaying the various tiers, portions of the database, and forms. The browser and the browser plug-in are customizable by the user to share information with other software also executing on the display computer system, including well-known graphical user interfaces, CAD/CAM presentation software, group presentation software. Accordingly, the user may view the database in whatever graphics software is familiar to the user. The browser and the browser plug-in are also customizable to share information with spreadsheet and financial software, such that the generation of a purchasing order may be shared with such spreadsheet and financial software.

The display is a computer monitor, cathode ray tube, flat panel display, thin panel display, LED (light emitting diode), or other display device that presents information. The display computer system may be a dedicated computer system that is dedicated to the presenting the portion of a database. If desired, the display may be replaced with a computer-readable data file. Accordingly, each step of displaying may be replaced with generating or updating a computer file. If desired, the display may be replaced with a printer or other device capable of presenting information in a permanent format.

As shown in FIG. 7, step 406 and step 426 of FIG. 7 include accessing the database. In accordance with one embodiment of the present invention, the database resides on a database computer system that is coupled to the display computer system via a network. Accordingly, the steps of accessing the database include accessing the database over a network. Specifically, the steps of accessing the database include accessing the database over the Internet. The display computer system therefore does not require any database information, and the database may be updated entirely on the database computer system.

If desired, the database computer system may be a web server providing web pages over the Internet. The database computer system receives the action from a user via a CGI script, java routine, or other script or program from the display computer system.

In accordance with another embodiment of the present invention, the display computer system and the database computer system are in fact a single computer system that performs both the displaying steps and the accessing steps. The database resides locally rather than remotely, and may be accessed over a local area network rather than over a wide area network or the Internet. For example, the database resides on a local server that is coupled to the single computer system. The database resides within read only memory, random access memory, cache memory, floppy disk memory, hard drive or hard disk memory, floppy drive or hard disk memory, zip drive memory, magnetic tape memory, CD memory, DVD memory, magnetic tape, and/or any device that stores digital information which can be read from or written to by the CPU.

In accordance with yet another embodiment of the present invention, the database is itself distributed over several locations. The database includes a basic database that resides on a local server that is coupled to the single computer system. The basic database resides within read only memory, random access memory, cache memory, floppy disk memory, hard drive or hard disk memory, floppy drive or hard disk memory, zip drive memory, magnetic tape memory, CD memory (including Read/Write CD-ROM), DVD memory, magnetic tape, and/or any device that stores digital information which can be read from or written to by the CPU.

The database also includes an update database that resides on a web server that is coupled to the display computer system via a network. Accordingly, the steps of accessing the database include accessing the update database over a network (i.e., the Internet). Since both local memory and remote memory are accessed, the display computer system operates quickly.

If desired, the update database may be stored in the local memory upon each access of the update database. The update database may be appended to the basic database residing on the local memory, or may replace all or some of the basic database. Whether the update database is stored locally, and if so, the manner in which the update database and the basic database are stored, may depend on the data structure used to implement the database. For example, if the database is a linked list, then the update database may simply be appended to the basic database already residing on local memory, with only minor modification of the basic database. If the database is implemented as a tree, however, or as a matrix, then the update database may replace all or some of the basic database.

The update database may itself be a browser plug-in. The update database may be downloaded from the database computer system to the display computer system and may serve as an extension to browser software residing on the display computer system.

Flowchart for Using Catalog

Figure 8:
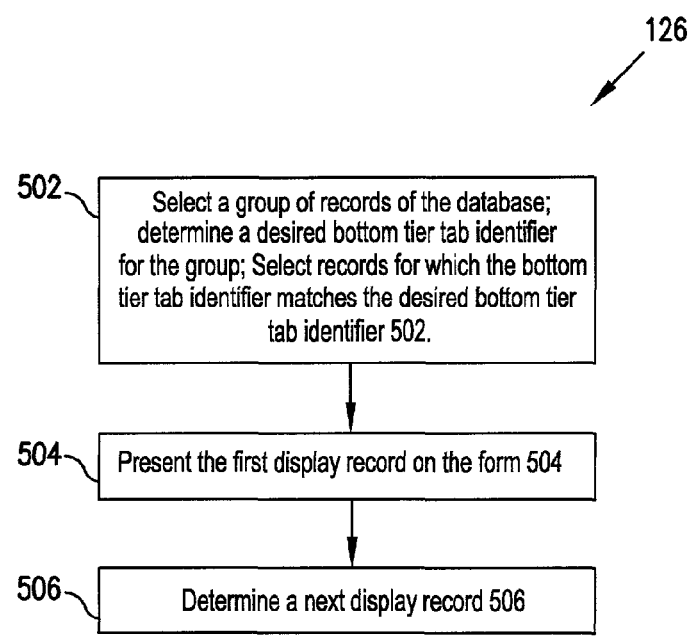
FIG. 8 shows a flowchart for displaying records.

FIG. 8 shows the step 126 in greater detail. Step 126 presents a form in response to an accessing of the selected portion of the database, such that the form represents a collection of records of tabs. In accordance with one embodiment of the present invention, step 126 includes a step 502 of selecting a group of records of the database based on the first tier selected graphics image, the second tier selected graphics image, and any further tier selected graphics image that may have been selected by the user. The group of records comprises the selected portion of the database.

Each of the records includes presentable content. The presentable content is text, graphics, audio, and/or video. The presentable content for a record may include a graphics image in JPEG (Joint Photographic Experts Group) format, GIF format, bitmap format, TIFF format, MPEG (Motion Picture Expert Group) format, or other computer-readable format such as JBIG (Joint Bi-Level Image Experts Group) format and non-text formats such as .xls, .dbs, etc. From the presentable content, a minimum vertical length and a minimum horizontal length for the presentable content may be determined.

Also, each of the records has several fields. One of the fields contains a bottom tier tab identifier. Accordingly, each record has a bottom tier tab identifier. Step 502 therefore determines a desired bottom tier tab identifier for the group, based on the first tier selected graphics image, the second tier selected graphics image, and any further tier selected graphics image that may have been selected by the user. Step 502 then selects records for which the bottom tier tab identifier matches the desired bottom tier tab identifier.

Each record may also contain an alpha field, an index field, and a manufacturer field. The first tier includes a tab labeled "Alpha," a tab labeled "Index," and a tab labeled "Manufacturer." If a user selects the tab labeled "Alpha," then the second tier includes a tab for each possible alpha value. If a user selects the tab labeled "Index," then the second tier includes a tab for each possible index value. If a user selects the tab labeled "Manufacturer," then the second tier includes a tab for each possible manufacturer.

It will be noted that the records of the database have an implicit or explicit order. In accordance with the implicit or explicit order, the group of records includes a first display record. At step 504, the first display record is presented on the form, which is otherwise devoid of display records. The first display record has a minimum vertical length and a minimum horizontal length, according to which the first display record is displayed on the form.

At step 506, in accordance with the implicit or explicit order, a next display record is determined. The next display record has a minimum vertical length and a minimum horizontal length. At step 506, a determination is made as to whether the next display record may be added to the form, based on the minimum vertical length and the minimum horizontal length of the next display record, and based on the minimum vertical length and the minimum horizontal length of any other display records already on the form.

As shown in FIG. 8, the records of the database are assigned to forms as the user selects various tabs of the various tiers. However, this is not the only manner in which the records may be assigned to forms. In accordance with another embodiment of the present invention, the records of the database are assigned to forms when, or before, the database is made available to the user. Accordingly, each tab of the bottom level is created for each form, and the tabs of the bottom level are created based upon a number of records that may be displayed on each form. If desired, previously created forms may also be examined for containing too many records, and the previously created forms that contain too many records may be split into multiple forms and assigned to multiple tabs of the bottom level.

Each record in the database also contains searchable fields that contain data such as price and/or availability. A user may define a search based upon the searchable fields, and may dynamically assign a tab to the search, so that the user can click on a tab and cause the software to re-execute the search. The search may be on a local server, on a remote server, or on several remote servers. Accordingly, when the user selects the tab that has been dynamically assigned to the search, the group includes all records that match the search. When the user defines a search, in accordance with one embodiment of the present invention, a software process is accessed that performs a database search when the tab assigned to the search is selected. In accordance with another embodiment of the present invention, the database is itself modified, such that at least one field of each record includes an indicator that has a first state (on/off) if the record matches the search and does not have the first state if the record does not match the search. The additional fields may be stored as linked list extensions from each record, and may reside locally while the database itself resides remotely over the Internet.

It should be understood that the implementation of other variations and modifications of the invention in its various aspects will be apparent to those of ordinary skill in the art, and that the invention is not limited by the specific embodiments described. For example, the method may be implemented in a stand-alone computer or other electronic device, or may be executed over the Internet. It is therefore contemplated to cover by the present invention, any and all modifications, variations, or equivalents that fall within the spirit and scope of the basic underlying principles disclosed and claimed herein.

Catalog Browser and an Electronic Bookcase Embodiment

Figure 9:
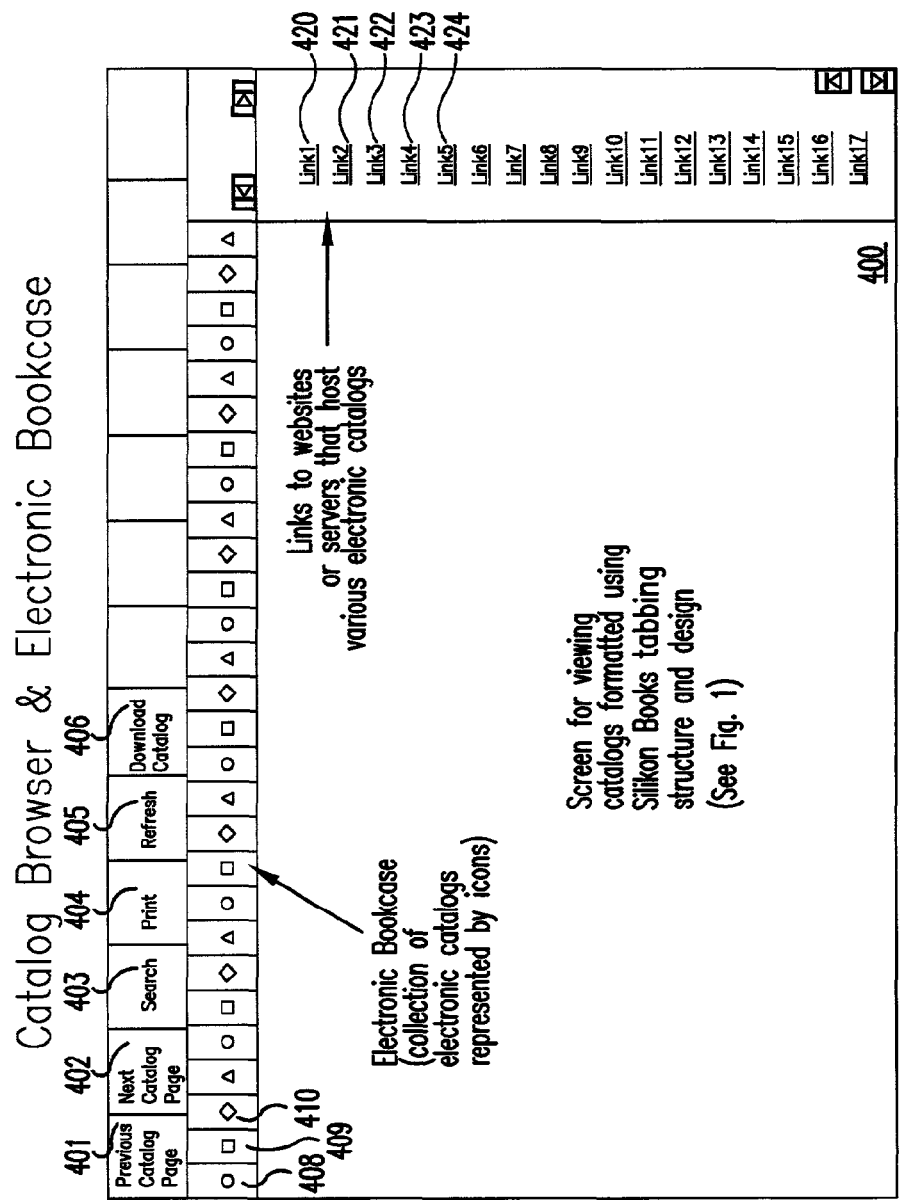
FIG. 9 shows a screen for a catalog browser and electronic bookcase purchasing workstation embodiment.

Referring now to FIG. 9, which is a screen of a catalog browser and an electronic bookcase embodiment of the current invention, the catalog viewing page 400 is displayed as in FIG. 1. The particular catalog to be displayed in the viewing page may be accessed through links to electronic catalogs as shown by elements 408, 409, and 410. Each of the links as indicated by 408-410 is preferably a direct link to an electronic catalog that is updated on a regular basis, so that each link is to a current catalog. This electronic access to current catalogs eliminates the time-consuming need to maintain an extensive collection of paper catalogs. Each of the links 408-410 may be text or graphic images suggestive of the catalog. In addition to the row of catalog access tabs 408-410, a collection of web site links 420-424 is shown. Each of these links is to a web site or server that hosts an electronic catalog of interest. For frequently used catalogs or for lower bandwidth communication users, it may also be desirable to locally store catalogs. Thus the links 408-410 and 420-424 may reference internet sites, intranet files, or local files, and the user does not need to specify the actual location of the information.

Once a catalog is accessed, it is preferably displayed in the viewing window 400 in a manner such as described by FIG. 1. The catalogs are preferably formatted in a manner that permits the display of the multiple tiers of tabs as described in FIGS. 1-8. This formatting may be provided by the vendor or a third party service. The tabs or buttons 401-406 permit each displayed catalog to be manipulated, such as accessing the previous catalog page 401, accessing the next catalog page 402, accessing a search menu for the catalog 403, accessing a printing menu to print a portion of the catalog 404, refreshing a catalog page 405, or downloading a catalog 406. In one embodiment, the tab or buttons 401-406 may represent a library of catalogs, so that the selection of a tab produces a library of one or more selectable catalog icons. For example, the tabs may represent various types of products or services such as an office products library with one or more office product vendor catalogs; one or more parts libraries for components of manufactured products; and one or more process equipment libraries for process equipment. Thus the libraries permit the organization and access of current catalogs for professionals including purchasing agents, engineers, scientists, and architects who require occasional or frequent access to a variety of catalogs.

What is claimed is:

1. A method for presenting information on an electronic page, the method comprising:
displaying, in a page viewing window of a browser, an electronic page of a catalog of products, wherein a first tier of tabs having respective letters thereon is presented on the page, each tab in the first tier of tabs representing a respective collection of data objects for the products of the catalog;
presenting second tier tabs in front of and adjacent to part of the first tier of tabs, including presenting the second tier tabs as blank tabs, visible in outline but with no labels thereon;
presenting a first labeled set of the second tier tabs having respective predefined product-type labels thereon in response to receiving a user selection of a first one of the tabs of the first tier, each tab in the first labeled set of second tier tabs belonging to the first tier's selected tab and representing a respective collection of data objects for the products of the catalog;
receiving a user selection of a tab of the first labeled set of second tier tabs and continuing to present at least a portion of the first tier of tabs after the user selection of the tab of the first labeled set of second tier tabs, wherein presenting the first labeled set of second tier tabs includes:
presenting the first labeled set of second tier tabs in front of and adjacent to part of the at least portion of the first tier of tabs;
presenting, in response to receiving a user selection of a second one of the tabs of the first tier, a second labeled set of second tier tabs having respective predefined product-type labels thereon, instead of presenting the first labeled set of second tier tabs, each tab in the second labeled set of second tier tabs belonging to the first tier's second selected tab and representing a respective collection of data objects for the products of the catalog;
receiving a user selection of a tab of the second labeled set of second tier tabs and continuing to present at least a portion of the first tier of tabs after the user selection of the tab of the second labeled set of second tier tabs, wherein presenting the second labeled set of second tier tabs includes:
presenting the second labeled set of second tier tabs in front of and adjacent to part of the at least portion of the first tier of tabs;
wherein the presenting of a first labeled set of second tier of tabs in response to receiving a user selection of a first one of the tabs of the first tier is not in response to receiving further user input other than the user selection of the first one of the tabs of the first tier and the presenting of a second labeled set of second tier of tabs in response to receiving a user selection of a second one of the tabs of the first tier is not in response to receiving further user input other than the user selection of the second one of the tabs of the first tier.

* * * * *